US010616663B2

(12) United States Patent
Davisson et al.

(10) Patent No.: US 10,616,663 B2
(45) Date of Patent: Apr. 7, 2020

(54) COMPUTER-IMPLEMENTED CAPTURE OF LIVE SPORTING EVENT DATA

(71) Applicant: Russell Brands, LLC, Bowling Green, KY (US)

(72) Inventors: Mark Joseph Davisson, Rensselaer, IN (US); Michael James Crowley, Attleboro, MA (US); Kevin William King, Columbus, OH (US)

(73) Assignee: Russell Brands, LLC, Bowling Green, KY (US)

( * ) Notice: Subject to any disclaimer, the term of this patent is extended or adjusted under 35 U.S.C. 154(b) by 0 days.

(21) Appl. No.: 14/411,678

(22) PCT Filed: Jun. 28, 2013

(86) PCT No.: PCT/US2013/048649
§ 371 (c)(1),
(2) Date: Dec. 29, 2014

(87) PCT Pub. No.: WO2014/008134
PCT Pub. Date: Jan. 9, 2014

(65) Prior Publication Data
US 2015/0382076 A1 Dec. 31, 2015

Related U.S. Application Data

(60) Provisional application No. 61/667,172, filed on Jul. 2, 2012, provisional application No. 61/725,305, filed on Nov. 12, 2012.

(51) Int. Cl.
*H04N 21/81* (2011.01)
*H04H 60/07* (2008.01)
(Continued)

(52) U.S. Cl.
CPC ........ *H04N 21/8126* (2013.01); *H04H 20/04* (2013.01); *H04H 60/07* (2013.01);
(Continued)

(58) Field of Classification Search
CPC .. H04N 21/8126; H04N 5/28; H04N 21/2187; H04N 21/4126; H04N 21/435; H04H 20/04; H04H 60/07
(Continued)

(56) References Cited

U.S. PATENT DOCUMENTS 4,479,649 A   10/1984   Newcomb et al.
4,577,865 A    3/1986   Shishido
(Continued)

FOREIGN PATENT DOCUMENTS

CN   1524004   8/2004
CN   1814333   8/2006
(Continued)

OTHER PUBLICATIONS

U.S. Appl. No. 61/028,823, filed Feb. 2008, Crowley.
(Continued)

*Primary Examiner* — Michael D Dennis
(74) *Attorney, Agent, or Firm* — Bradley Arant Boult Cummings, LLP; Jacob Neu

(57) ABSTRACT

A computer-implemented data acquisition method includes obtaining motion data telemetrically from a wireless transmitter mounted on or inside a sporting device that is handled by athletes in an athletic event, and presenting the data to viewers of the sporting event. The data includes motion data that is captured while the sporting device is being used in the athletic event and represents motion of the sporting device captured by one or more motion sensors connected to the wireless transmitter.

3 Claims, 11 Drawing Sheets

(51) Int. Cl.
  *H04H 20/04* (2008.01)
  *H04N 5/28* (2006.01)
  *H04N 21/2187* (2011.01)
  *H04N 21/41* (2011.01)
  *H04N 21/435* (2011.01)

(52) U.S. Cl.
  CPC .......... *H04N 5/28* (2013.01); *H04N 21/2187* (2013.01); *H04N 21/4126* (2013.01); *H04N 21/435* (2013.01)

(58) Field of Classification Search
  USPC ....................................................... 473/570
  See application file for complete search history.

(56) References Cited

U.S. PATENT DOCUMENTS

| | | | |
|---|---|---|---|
| 4,595,200 | A | 6/1986 | Shishido |
| 4,776,589 | A | 10/1988 | Yang |
| 5,102,131 | A | 4/1992 | Remington |
| 5,236,383 | A | 8/1993 | Connelly |
| 5,609,411 | A | 3/1997 | Wang |
| 5,779,576 | A | 7/1998 | Smith et al. |
| 5,810,685 | A | 9/1998 | Willner et al. |
| 6,013,007 | A | 1/2000 | Root et al. |
| 6,148,271 | A | 11/2000 | Marinelli |
| 6,196,932 | B1 | 3/2001 | Marsh et al. |
| 6,251,035 | B1 | 6/2001 | Fa |
| 6,565,449 | B2 | 5/2003 | Buhler |
| 6,582,330 | B1 | 6/2003 | Rehkemper et al. |
| 6,671,390 | B1 | 12/2003 | Barbour et al. |
| 6,744,375 | B1 | 6/2004 | Groos |
| 6,757,572 | B1 | 6/2004 | Forest |
| 6,856,934 | B2 | 2/2005 | Vock et al. |
| 7,014,581 | B2 | 3/2006 | Ng |
| 7,021,140 | B2 | 4/2006 | Perkins |
| 7,072,789 | B2 | 7/2006 | Vock et al. |
| 7,092,846 | B2 | 8/2006 | Vock et al. |
| 7,162,392 | B2 | 1/2007 | Vock et al. |
| 7,192,387 | B2 | 3/2007 | Mendel |
| 7,234,351 | B2 | 6/2007 | Perkins |
| 7,273,431 | B2 | 9/2007 | DeVall |
| 7,308,818 | B2 | 12/2007 | Considine et al. |
| 7,625,314 | B2 | 12/2009 | Ungari et al. |
| 7,643,895 | B2 | 1/2010 | Gupta et al. |
| 7,813,821 | B1 | 10/2010 | Howell |
| 7,891,666 | B2 | 2/2011 | Kuenzler et al. |
| 7,899,307 | B1* | 3/2011 | Hughes .............. A63B 24/0003 386/343 |
| 8,070,654 | B2 | 12/2011 | Chapa, Jr. et al. |
| 8,078,478 | B2 | 12/2011 | Fleming et al. |
| 8,083,646 | B2 | 12/2011 | Chapa, Jr. et al. |
| 8,086,421 | B2 | 12/2011 | Case, Jr. et al. |
| 8,109,858 | B2 | 2/2012 | Redmann |
| 8,112,251 | B2 | 2/2012 | Case, Jr. et al. |
| 8,128,410 | B2 | 3/2012 | Prstojevich |
| 8,152,695 | B2 | 4/2012 | Riley et al. |
| 8,172,722 | B2 | 5/2012 | Molyneux et al. |
| 8,206,219 | B2 | 6/2012 | Shum et al. |
| 8,231,487 | B2 | 7/2012 | Nurnberg et al. |
| 8,231,506 | B2 | 7/2012 | Molyneux et al. |
| 8,465,376 | B2* | 6/2013 | Bentley .............. A63B 24/0006 473/219 |
| 8,517,870 | B2 | 8/2013 | Crowley et al. |
| 8,540,560 | B2 | 9/2013 | Crowley et al. |
| 8,579,632 | B2 | 11/2013 | Crowley |
| 8,597,095 | B2 | 12/2013 | Crowley et al. |
| 8,663,040 | B2 | 3/2014 | Kortegast |
| 8,951,106 | B2 | 2/2015 | Crowley et al. |
| 2003/0033157 | A1* | 2/2003 | Dempski .............. H04N 5/4401 725/32 |
| 2003/0207718 | A1 | 11/2003 | Perlmutter |
| 2003/0224885 | A1 | 12/2003 | Leal et al. |
| 2003/0228934 | A1 | 12/2003 | Corzilius et al. |
| 2004/0073437 | A1* | 4/2004 | Halgas, Jr. ............. G06Q 30/02 715/723 |
| 2005/0069853 | A1 | 3/2005 | Tyson et al. |
| 2005/0288133 | A1 | 12/2005 | Rudell |
| 2006/0025282 | A1 | 2/2006 | Redmann |
| 2006/0135297 | A1 | 6/2006 | Cruciani |
| 2006/0148594 | A1 | 7/2006 | Saintoyant et al. |
| 2006/0189386 | A1 | 8/2006 | Rosenberg |
| 2007/0021244 | A1 | 1/2007 | Ko |
| 2007/0026975 | A1 | 2/2007 | Marty et al. |
| 2007/0281811 | A1 | 12/2007 | Wang |
| 2008/0015064 | A1 | 1/2008 | Nelson et al. |
| 2008/0026877 | A1 | 1/2008 | Neel |
| 2008/0139307 | A1 | 6/2008 | Ueshima et al. |
| 2009/0029754 | A1 | 1/2009 | Slocum et al. |
| 2009/0047645 | A1 | 2/2009 | Dibenedetto et al. |
| 2009/0048044 | A1 | 2/2009 | Oleson et al. |
| 2009/0048070 | A1 | 2/2009 | Vincent et al. |
| 2009/0189982 | A1* | 7/2009 | Tawiah .............. A63B 24/0006 348/157 |
| 2009/0210078 | A1 | 8/2009 | Crowley |
| 2009/0298650 | A1 | 12/2009 | Kutliroff |
| 2009/0325739 | A1 | 12/2009 | Gold |
| 2010/0017820 | A1* | 1/2010 | Thevathasan ........ G11B 27/036 725/35 |
| 2010/0048302 | A1 | 2/2010 | Lutnick et al. |
| 2010/0053324 | A1 | 3/2010 | Kim et al. |
| 2010/0069181 | A1 | 3/2010 | Lin |
| 2010/0105480 | A1 | 4/2010 | Mikhailov et al. |
| 2010/0130315 | A1 | 5/2010 | Steidle |
| 2010/0184563 | A1* | 7/2010 | Molyneux ............ A43B 1/0054 482/1 |
| 2010/0283630 | A1* | 11/2010 | Alonso .................... H04Q 9/00 340/870.11 |
| 2010/0285903 | A1 | 11/2010 | Nicodem |
| 2011/0077112 | A1 | 3/2011 | Erario et al. |
| 2011/0118062 | A1 | 5/2011 | Krysiak et al. |
| 2011/0220634 | A1 | 9/2011 | Yeh |
| 2011/0316529 | A1 | 12/2011 | Stancil et al. |
| 2012/0029666 | A1 | 2/2012 | Crowley |
| 2012/0058845 | A1 | 3/2012 | Crowley |
| 2012/0129138 | A1 | 5/2012 | Redmann |
| 2012/0231906 | A1 | 9/2012 | Barry et al. |
| 2013/0079906 | A1 | 3/2013 | Crowley et al. |
| 2013/0311595 | A1* | 11/2013 | Milatinovici .... H04N 21/26275 709/214 |
| 2014/0031151 | A1 | 1/2014 | Crowley |
| 2014/0039651 | A1 | 2/2014 | Crowley |
| 2014/0081436 | A1 | 3/2014 | Crowley et al. |

FOREIGN PATENT DOCUMENTS

| | | |
|---|---|---|
| CN | 101367013 | 2/2009 |
| EP | 1 637 192 | 3/2006 |
| JP | 2007-014671 | 1/2007 |
| KR | 10-1988-0001317 | 4/1988 |
| KR | 2000055834 | 9/2000 |
| KR | 2001008367 | 2/2001 |
| WO | WO 1995/034351 | 12/1995 |
| WO | WO 1999/016511 | 4/1999 |
| WO | WO 2009/102813 | 8/2009 |
| WO | WO 2010/111705 | 9/2010 |
| WO | WO 2012/033732 | 3/2012 |

OTHER PUBLICATIONS

U.S. Appl. No. 61/164,277, filed Mar. 2009, Crowley.
U.S. Appl. No. 61/249,526, filed Oct. 2009, Crowley.
"Built-in Speed Sensor Records How Fast You Throw the Ball—Used As a Training Aid for Pitchers," Markwort Sporting Goods Company [online], [retrieved on May 22, 2012] Retrieved from the Internet:<URL: http://www.markwort.com/featured/speedsensor.asp>.
"Intelligent Basketball Tracks Trajectory," Freescale [online] [retrieved on May 23, 2012]. Retrieved from the Internet: <URL: http://www.freescale.com/webapp/sps/site/overview.jsp?code=CASE_STUDY_INTELLIGENT_BASKETBALL>, 2 pages.

(56) References Cited

OTHER PUBLICATIONS

"Speed Sensor™ Programmable Balls," Markwort [online], [retrieved on May 25, 2012]. Retrieved from the Internet: <URL: http://www.markwort.com/featured_tab/speedsensor_big.asp>, 2 pages.
Hsu, Michael. "Gear & Gadgets: Making Sense of Your Swing, Turn Your Golf Glove Into a High-Tech Coach." The Wall Street Journal, Aug. 4-5, 2012. (1 page).
Murray, "Freescale Rolls Out World's First Intelligent Basketball," Design News Blog, Jun. 29, 2007 [retrieved May 22, 2012] Retrieved from the Internet:<URL: http://www.designnews.com/author.asp?section_id=1386&doc_id=215078&print=yes>.
Authorized Officer D. Kim, International Search Report and Written Opinion for PCT/US2010/029068, dated Oct. 21, 2010, 13 pages.
Authorized Officer RA Kwang Pyo, International Search Report/Written Opinion in PCT/US2009/033831 dated Sep. 24, 2009, 11 pages.
Authorized Officer S. Baharlou, International Preliminary Report on Patentability for PCT/US2010/029068, dated Oct. 6, 2011, 9 pages.
Authorized Officer Y. Cussac, International Preliminary Report on Patentability in PCT/US2009/033831, dated Aug. 26, 2010, 6 pages.
International Search Report and Written Opinion in International Application No. PCT/US2011/050498, dated Apr. 25, 2012, 9 pages.
International Preliminary Report on Patentability in International Application No. PCT/US2011/050498, dated Mar. 12, 2013, 6 pages.
International Search Report and Written Opinion in International Application No. PCT/US2013/048958, dated Sep. 27, 2013, 15 pages.
International Search Report and Written Opinion in International Application No. PCT/US2013/048649, dated Oct. 22, 2013, 10 pages.
Extended European Search Report in EP Application No. 11824001.9, dated Apr. 3, 2014, 6 pages.
International Preliminary Report on Patentability in International Application No. PCT/US2013/048649, dated Jan. 6, 2015, 7 pages.
International Preliminary Report on Patentability in International Application No. PCT/US2013/048958, dated Jan. 15, 2015, 12 pages.

* cited by examiner

COMPUTER-IMPLEMENTED CAPTURE OF LIVE SPORTING EVENT DATA

CROSS-REFERENCE TO RELATED APPLICATIONS

This application is a National Stage application under 35 U.S.C. § 371 of International Application No. PCT/US2013/048649, having and International Filing Date of Jun. 28, 2013, which claims the benefit of U.S. Provisional Application Ser. No. 61/667,172, filed Jul. 2, 2012, and U.S. Provisional Application Ser. No. 61/725,305, Nov. 12, 2012. The disclosure of the prior applications are considered part of (and are incorporated by reference in) the disclosure of this application.

TECHNICAL FIELD

This document relates to systems and techniques for capturing data from sensors mounted in a sporting device, such as a basketball or soccer, during gameplay of a sporting event.

BACKGROUND

Athletics has become an integral part of society, with multiple television channels dedicated to sporting events, with professional athletes promoting all sorts of products, and with the public holding star athletes—both amateur and professional—in high regard, so as to support financial rewards such as college scholarships, sponsorship opportunities, and other revenue-generating careers. Millions of people watch professional and collegiate athletic events on any given night, and hundreds of millions watch major events like the Super Bowl, Final Four, the soccer World Cup, and other championships.

Such broadcasts of events are often accompanied by limited information about the event, such as presented in a scoreboard area in a corner of the screen or along a top or bottom edge of the screen. The information typically includes the current score, the time remaining, the period, timeouts remaining, and event-specific information such as the presence of a flag in football, and the down and yardage in football. Live commentators also frequently comment on the skill level of a particular sports move, such as by showing a slow-motion replay and commenting about a player's "quick first step," or "smooth release," or other similar subjective observations made by the commentator about a particular interesting play (e.g., a scoring play or turnover).

SUMMARY

This document describes systems and techniques that may be used to telemetrically capture motion data from sensors in a sporting device that is handled by one or more players in a sporting event, to convert such data into a human-understandable form, and to aggregate the data and/or present the data in real-time to viewers of the sporting event. For example, when a player in a basketball game takes a shot from a particular distance, the arc of the basketball may be computed, and may be displayed in an overlay with the paths of other previously made and missed shots by the player. Such real-time display may occur with the data being shown while the ball is still in the air (or the ball being superimposed with the color red, yellow, or green in-flight to indicate a prediction that the shot will be in or not, based on data collected from the sensors as the ball left the player's hand, or as part of an instant replay where different data may be shown in different versions of the replay. For example, the force of a dribble leading up to a shot may be shown from a full court replay, while the angle of a subsequent shot (as it leaves the shooter's hand) may be shown as an overlay on a court-level, horizontally-shot replay angle.

The data collected from the sensors may also be correlated to and combined with other data, such as data collected by human observers of the event or sensors located outside the sporting device. For example, a human observer may provide input to a computer when the identity of the player handling a basketball changes (e.g., there is a pass or a steal), and a system may identify certain motion data being reported from the basketball to register the exact time of the change with the system (e.g., a relatively soft acceleration followed by a relatively soft deceleration may indicate the passing of a basketball from one player to another, where a hard deceleration and change in direction in the middle may indicate that it was a bounce pass). In more general terms, a central system can identify the user-entered data and then "look" for other sensor data from the ball that matches such an action, so as to make the timing of the change in possession more precise. Particular motion data may then be associated with particular players (e.g., to form statistics relating to the players beyond the statistics that are traditionally kept). For example, a number of dribbles or a number of feet traveled while dribbling may be computed for players in a league, which statistic may be of interest to statisticians, coaches, scouts, or fans. Automatically gathered data from outside the sporting device may include, for example, location data that maps the location of a basketball and of players on a court during a game. Such location data may be gathered by laser-based systems, triangulation, or other techniques, and may be used, for example, to show an animated version of the event where particular players were at particular times (e.g., where a player who grabbed a rebound was when the ball left the shooter's hand—so as to obtain more Sabermetrics-like information for objectively identifying how "off the ball" players operate).

As noted, such data may be combined and be presented in real-time with the gameplay in the event, such as by visually superimposing human-understandable data over a screen that simultaneously shows players in a game, either live as the game is played, or in a replay soon after a particular play occurs. For example, data can be shown that compares the motion from the present play to motion from other similar plays that were successful or unsuccessful (for the same player or for other players), such as the amount of spin, acceleration, or arc on made or missed jump shots in basketball. Also, an indicator may be shown to present a likelihood that the particular play will be a success (before the balls goes in or fails to go in), by comparing the motion with motion for prior successful and unsuccessful plays. Also, slow-motion and stop-motion replays may be displayed to show particular measured motion values during the progress of a big play, such as time between dribbles on a drive (where the first dribble may be very slow, as a point guard sets up the drive), and then G forces applied to a dunk.

The relevant data may also be aligned with clock time for a game and may be stored and later used in various manners. For example, a "transcript" of a game may be kept, where various data points are correlated to clock time in a sporting event (and the audio-video may similarly be correlated). The raw motion data may be aligned with such clock time, and separately, more directly useful information may be stored. For example, a separate axis aligned with the time may indicate who possessed the ball during each time period, where the identity of the possessor may have been provided by a person observing the game, and the exact time cut-overs for switching possession may be set by using recognized patterns in the motion data (such as by identifying a pass as described above). Information may also be saved regarding game data, such as whether a particular shot was made, whether there was a turnover, and other information that may be relevant for use in later statistical analysis—and that may have been recorded manually (i.e., by a human observer who watches a game and enters data), automatically (e.g., by courtside sensors or by computerized video analysis or by sensors in the ball that determine floor location), or semi-automatically (e.g., by applying manual checks to automatically-generated data or by combining automatic data with manual data, such as in the approach for identifying exact times of possession changes as described here).

The various saved data may be aggregated, analyzed, and presented in various manners. For example, original raw motion data can be stored and can be analyzed at any point for a variety of purposes, including purposes that were not conceived when the data was captured.

Similarly, derived motion data, such as human-understandable data, can be analyzed more easily, though perhaps less flexibly, such as to produce reports about the play of particular players. For example, a television analyst may generate a report to indicate which basketball players have the fastest or highest-frequency dribbles, or the fastest cross-over dribble moves. Such data can be used to confirm subjective views of the analyst and also to present such information as statistics for viewers of a program, in the manner of many other statistics, such as points per game, shooting percentage, and the like. Also, such historical data may be gathered each time a particular player makes a particular play (e.g., a jump shot, free throw, slam dunk, etc.), so as to compare the data for the current play against data from previous times the player has made the same play, such as by accumulating motion data from free throws that a particular player makes or misses.

In certain implementations, such systems and technique may provide one or more advantages. For example, spectators watching a sporting event on television may receive an improved experience by being shown additional information about a game, and may learn more about the sport they are watching. Also, a broadcaster can supplement rough measures of performance like shooting percentage and subjective analyst characterizations of a player's abilities with more fine-grained objective measures that can only be captured well by instrumentation in the ball or other item being handled by players in a game. Such additional data may be displayed while one or more slow-motion and/or stop-motion replays are shown during a broadcast, allowing a color commentator to comment on the data and how it may have affected the particular play. The data may also be used after a game, such as in comparative analysis of multiple players by an in-studio analyst (e.g., showing the average shot angle from X feet for the top 5 point guards in a league), or in a week-in-review show that displays the 5 most powerful dunks of the week.

Outside of public presentation of such data, coaches and talent evaluators may have access to more complete and detailed data about player performance, and may perform a wide variety of statistical analyses on such data (e.g., for determining whether to draft or trade a player). For example, a team can determine whether a particular player's dribble speed or shot backspin changes later in a game when the player is fatigued, and may use such information to determine whether to select the player in a trade or draft, to provide targeted training to correct deficiencies, or in real-time to pull a player and get the player rest if the fine-grained objective measures indicate that the player needs a rest.

In one general aspect, a computer-implemented data acquisition method is provided herein. The method comprises: obtaining motion data telemetrically from a wireless transmitter mounted on or inside a sporting device that is handled by athletes in an athletic event, the data includes motion data that represents motion of the sporting device and that is captured while the sporting device is being used in the athletic event, the data captured by one or more motion sensors connected to the wireless transmitter; and processing the motion data with one or more processors of a computing system to create human-interpretable descriptive data that identifies one or more particular features of the sporting device's motion during an identified time period.

In various implementations, the method may further comprise providing the descriptive data for broadcast in real-time or near real-time with video broadcast of the athletic event. The method may further comprise identifying beginning and ending boundaries for the identified time period based on motion of the sporting device matching a profile motion for known athletic occurrences for a sport that corresponds to the athletic event. The known athletic occurrences may be selected from the group consisting of a shot, a throw, a kick, a pass, and a dribble. The method may further comprise coordinating the obtained motion data, the descriptive data, or both, with manually-entered data that identifies which player, of a plurality of players, was responsible for creating the motion data. Coordinating the obtained motion data may comprise analyzing the motion data to identify boundary events that represent changes in possession, between particular players, of the sporting device. The method may further comprise updating statistical records for particular players over the course of the athletic event using the obtained motion data, descriptive data, or both. The method may further comprise coordinating the obtained motion data, the descriptive data, or both, as being created by one of a plurality of teams that are taking part in the athletic event. The method may further comprise creating per-player skill models using the motion data, the per-player skill models representing characteristics of athletic performance characteristics for particular ones of the players in a human-discernable and human-interpretable form. The method may further comprise generating a game transcript that represents a chronological indication of motion events during the athletic event coordinated with particular players who created the motion events.

In another general aspect, this document describes one or more computer-readable storage media having recorded thereon instructions, that when executed, perform operations comprising: obtaining motion data telemetrically from a wireless transmitter mounted on or inside a sporting device that is handled by athletes in an athletic event, the data, including motion data that is captured while the sporting device is being used in the athletic event and representing motion of the sporting device captured by one or more motion sensors connected to the wireless transmitter; and processing the motion data with one or more processors of a computing system to create human-interpretable descriptive data that identifies one or more particular features of the sporting device's motion during an identified time period.

In various implementations, the operations may further comprise providing the descriptive data for broadcast in real-time or near real-time with video broadcast of the athletic event. The operations may further comprise identifying beginning and ending boundaries for the identified time period based on motion of the sporting device matching profile motion for known athletic occurrences for a sport that corresponds to the athletic event. The known athletic occurrences may be selected for a group consisting of a shot, a throw, a kick, a pass, and a dribble. The operations may further comprise coordinating the obtained motion data, the descriptive data, or both, with manually-entered data that identifies which player, of a plurality of players, was responsible for creating the motion data. Coordinating the obtained motion data may comprise analyzing the motion data to identify boundary events that represent changes in possession, between particular players, of the sporting device. The operations may further comprise updating statistical records for particular players over the course of the athletic event using the obtained motion data, descriptive data, or both. The operations may further comprise coordinating the obtained motion data, the descriptive data, or both, as being created by one of a plurality of teams that are taking part in the athletic event. The operations may further comprise creating per-player skill models using the motion data, the per-player skill models representing characteristics of athletic performance characteristics for particular ones of the players in a human-discernable and human-interpretable form. The operations may further comprise generating a game transcript that represents a chronological indication of motion events during the athletic event coordinated with particular players who created the motion events.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
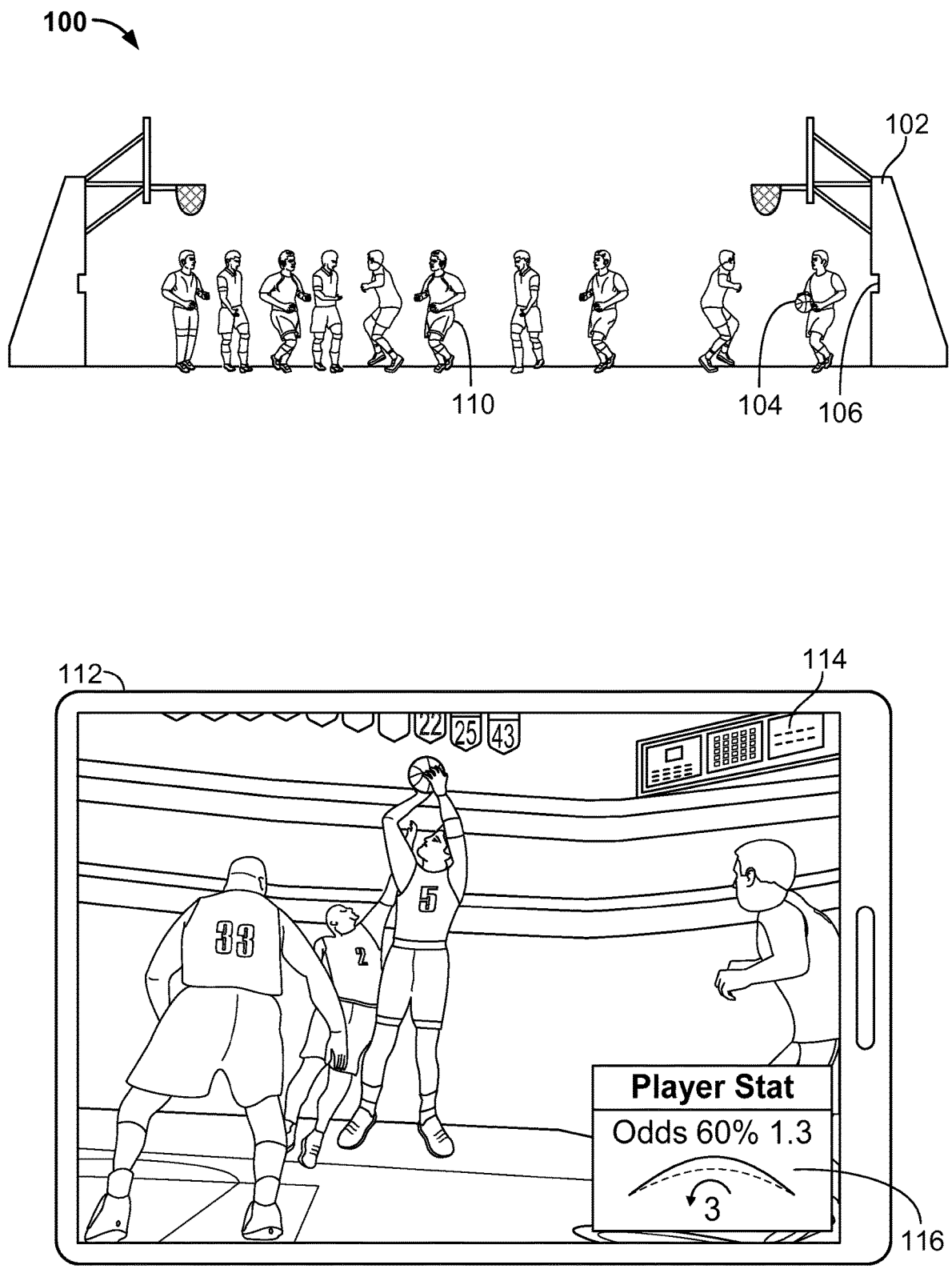
FIG. 1 is a conceptual diagram of a basketball game in real-time play and a mobile device displaying information about performance in the game.

This document describes systems and techniques for capturing motion data from an athletic device that is handled by a number of different athletes during an athletic event—such as a basketball, baseball, soccer ball, and other such device—and converting the motion data for real-time video display along with video captured of the athletic event (and for subsequent storage and use of such data). For example, data that characterizes the actual motion of a ball can be converted into a representative number or a graph and can be super-imposed at the edge of a television screen for an ongoing game or on another device, such as a mobile computer tablet. Such motion data may also be time-aligned with the game clock as the data is captured, and other relevant data can likewise be aligned with the game clock, both as it is captured, and further aligned using the motion data. For example, a change of possession between two players on a basketball team can be indicated by a human analyst who is watching a basketball game, though the entry of such information will be naturally delayed somewhat from the actual time that the change of possession occurred. The motion data that has been aligned with the clock from the time it is captured (with a non-appreciable delay) may then be used to identify the precise time of the change of possession (using profiles of motion that represent various predictable events such as passes, shots, alley oops, and dunks), and the analyst-entered data may be aligned with the clock at such identified times. Yet additional data may be captured, such as real-time temperature and wind data for a football game, and location information that indicates where on a court or field the ball and various players were located at various times during a game. Such information, like the motion data, may be captured automatically in real-time and may thus be naturally aligned with the game clock.

In providing such data to viewers of an event, the raw motion data may be converted into a human-understandable form. A human-understandable form is one that can be understood by a typical sports fan, such as the hang-time of a ball, a graph showing the path of a ball, the power with which a ball was hit, and similar representations. It is to be contrasted with raw motion data, from which the human-understandable data is derived, and that is not understandable to humans at all, or is understandable only to highly-trained individuals who work in the area of such data acquisition, and may include data showing particular acceleration and rotations values as they change over time. Generally, multiple values of raw data are combined into a simpler representation in order to form the human-understandable data. For example, multiple complex sensors readings may be combined to determine the number of revolutions a ball made between leaving a player's hand or foot and before making a goal, or the RPMs of the ball (which may be computed using a time taken from the on-ball data or from an external timer that is compared to the motion data).

The various pieces of data, and in particular, motion data that is associated with a particular player from among multiple players in a game, may also be stored for later analysis and presentation. For example, the amount of time that a particular player controls a ball in a game may be recorded after adding up each of the individual possessions for the player, where the times at which a player gained or lost possession are determined using motion sensors in the ball. Also, the speed with which a player performs certain operations with a ball may be checked, and an average for the player may be produced. Such statistical information that is derived from the motion data, and perhaps from other data gathered outside the ball or other item that moves, may then be used in various ways. For example, an NFL analysis program may analyze the average time that particular running backs carry a ball before being tackled and a play is whistled dead. Such a statistic may be interesting if a running back that has the longest time has a very low average yards per carry, or a very high average yards per carry.

With such large amounts of raw data available, machine learning techniques may also be used to identify correlations between particular measured values and actual athletic performance. For example, a system may be trained with data from motions sensors, and associated scoring data for various players. From such training, a system may identify relevant correlations that may not have been apparent from subjective player evaluation. For example, shot angle may be correlated with scoring efficiency under certain different situations, such as to identify whether particular shooting angles work better from various different directions of shot around a bucket, and certain various distances from which shots are taken.

Such data may also be made available on-demand via one or more software applications that may be correlated to video on-demand of sporting events. For example, the top N actions for a night or week of sports may be identified by a system, such as the 10 strongest dunks as measured by G force of the respective dunks. Such dunks may be displayed in a list that shows the game in which the dunk occurred, the G forces, and the name of the player who made the dunk. A user of a smartphone, tablet, or other computer may select one of the entries in the list to have video of the dunk displayed to them, and may subsequently choose to "like" or "endorse" the dunk so that a link to the video is displayed to their friends in a social network, for example.

FIG. 1 is a conceptual diagram of a basketball game in real-time play and a mobile device displaying information about performance in the game (e.g., a device held by someone at the game or someone who is watching a live broadcast of the game on the device or on a television that is separate from the device). In general, the figure shows mechanisms by which data may be gathered during a game (both from sensors in a ball and from other sources) and shown in real-time or near real-time. Real-time display is display of corresponding data effectively as the action takes place, such as while a shot is still being made, essentially on the order of one second. Near real-time is during a single short viewing transaction, such as by providing motion-based data in conjunction with an instant replay, e.g., on the order of about 10 seconds, and under a minute. Real-time presentation of data may also be achieved where a small amount of delay is applied to audio and video of a contest, thus allowing data (which may include some processing delay) to be added to the audio and video so that it appears to be provided time-wise with the action.

Referring now more specifically to FIG. 1, a side view of a basketball court 100 with players on it is shown. In this example, the players are arranged to indicate that a basket has just been scored at the right goal 102, the ball 104 is being inbounded under the right goal 102, and all players except for two offensive players have run to the other end of the court and are positioning themselves for the next possession. In this example, sensors and other electronics may be provided inside the ball 104 for sensing motion of the ball 104—and may have just sensed that the basket was attempted and made. Alternatively, or in addition, sensors 106 may be provided under, in, above, or around the periphery of the court, such as laser and sonar sensors, or cameras that feed their output to a system that employs machine-based object recognition (e.g., to identify where players are on the court and to identify who those players are, such as recognizing jersey colors and numbers).

The data collected by such sensors can be telemetrically transmitted, processed and presented in various manners, including as part of a sporting-related telecast. For example, very precise data about ball movement may be obtained from sensors in the ball 104 and may be relayed immediately (e.g., using wireless technology such as Bluetooth or WiFi), or after the ball 104 has been moved to a data-transfer station (e.g., during a time-out). Such data can include information about ball 104 speed, forces, and acceleration, as well as spin rate and other parameters of the way in which the ball 104 moves and is handled by players. Data from the sensors 106 can register the location of the ball on the court 100, and the location of various players on the court 100. Additionally, manually-entered information may be entered by human observers of the sporting event, such as by an observer making a selection to identify which player is possessing the ball 104 at each moment in time (if automatic recognition of such information is deemed impractical).

Such information from various sources may thus be combined in real-time or after-the-fact so that various interesting presentations can be made with the data. For example, the G force of each dribble by a point guard can be registered and presented in real-time (e.g., as an absolute number or as a graphic, such as a color superimposed around the spot on the court where the ball bounces, and where a redder color represents hard bouncing and a bluer color represents soft), so that viewers of a telecast can appreciate the changes in force that the point guard applies when looking for an open man versus starting a drive. As another example, a graph can be shown during a game that compares current motion of the ball by a player or motion of the player across the court 100, to similar motion in times earlier in a game, such as for a game commentator to make a point that a particular player has tired during the game.

While this example shows such sensors used in a basketball 104, sensors may be used in other types of balls or other items (e.g., pucks) and in or around other types of playing surfaces in manners like those shown and discussed above and below. For example, sensors may be placed in a soccer ball and around the edges of a soccer goal so as to track the forces and acceleration on a ball when a shot is attempted, and to track and record the trajectory of the ball during the shot. Similarly, the acceleration of a football during a punt can be measured by sensors in the football, and its trajectory can be sensed via sensors around the field, so that an estimated landing spot may be superimposed on a television display of the field (e.g., with a red spot) so that viewers can determine whether the punt returner is currently located in the right position, and can also see how long it takes the punt returner to adjust to the location of the ball.

As suggested by these examples, the time at which such data is used can also vary. For example, in the punting example above, the data may be presented in real-time with the play on the field (though the telecast can be delayed slightly if that is necessary to allow the processing of the data to "catch up"). The data may also be processed and used in a similar manner over an instant replay display of a play, such as in the punting example, by only showing the red spot in a replay, in association with a color commentator's remarks indicating, e.g., that the return man flubbed the catch because he was late in "reading" the punt trajectory. The data may also be used for a much-later presentation. For example, a studio analyst may want to display a list of point guards who have the highest dribble force to start a drive or the quickest step, and to interleave the display of such information with highlight clips showing those players driving to the hoop. Other sorts of data will be determined by analysts and may become "standards" in sports broadcast, just as traditional statistics like slugging percentage have become standards today.

The data discussed here can also be combined with more traditional data that is already being gathered for sporting events. For example, a computer system could perform a search on traditional statistics, such as to pull motion data for games in which a player had below average performance (e.g., shot percentage below x %) and motion data for games in which the player had above average performance (e.g., shot percentage above x %), so as to compare the two groups of data (if it has been previously determined that such data might correlate to performance). A television broadcast could then display such information to help emphasize a point that the color commentator can make during the broadcast.

The lower portion of FIG. 1 shows a replay that may be displayed of the shot that was just made, and broadcast while the inbounds event from the top view is occurring. The replay here is being shown in a tablet computer 112 that may be at a site of the game (e.g., in club seats or luxury suites) and/or at a viewer's home. Superimposed over video of the replay is a graphic that shows information predicting the likelihood that the shot will fall. For example, the system can consider the speed with which Kevin Garnett (the hypothetical player in this example) picked up the ball, the amount he rotated the ball, the distance he brought the ball back (determined by velocity and time), and other similar factors can be compared to similar data from prior shots by Garnett (and perhaps from similar locations on the court or distances from the hoop when the actions occurred) and whether those shots were made or missed, to provide a prediction that the shot will go in (60% here), along with a comparison to Garnett's normal likelihood (here, 30% better, as shown by the 1.3 deviation). In addition, an arc is shown to indicate a trajectory of the shot, compared to a dashed line that shows a trajectory of a typical made (or missed) shot for Garnett. And at the bottom of the overlay is shown an indicator that the ball rotated three times during its flight (which would be shown if analysts determined that such a factor had something to do with shot accuracy).

Figure 2:
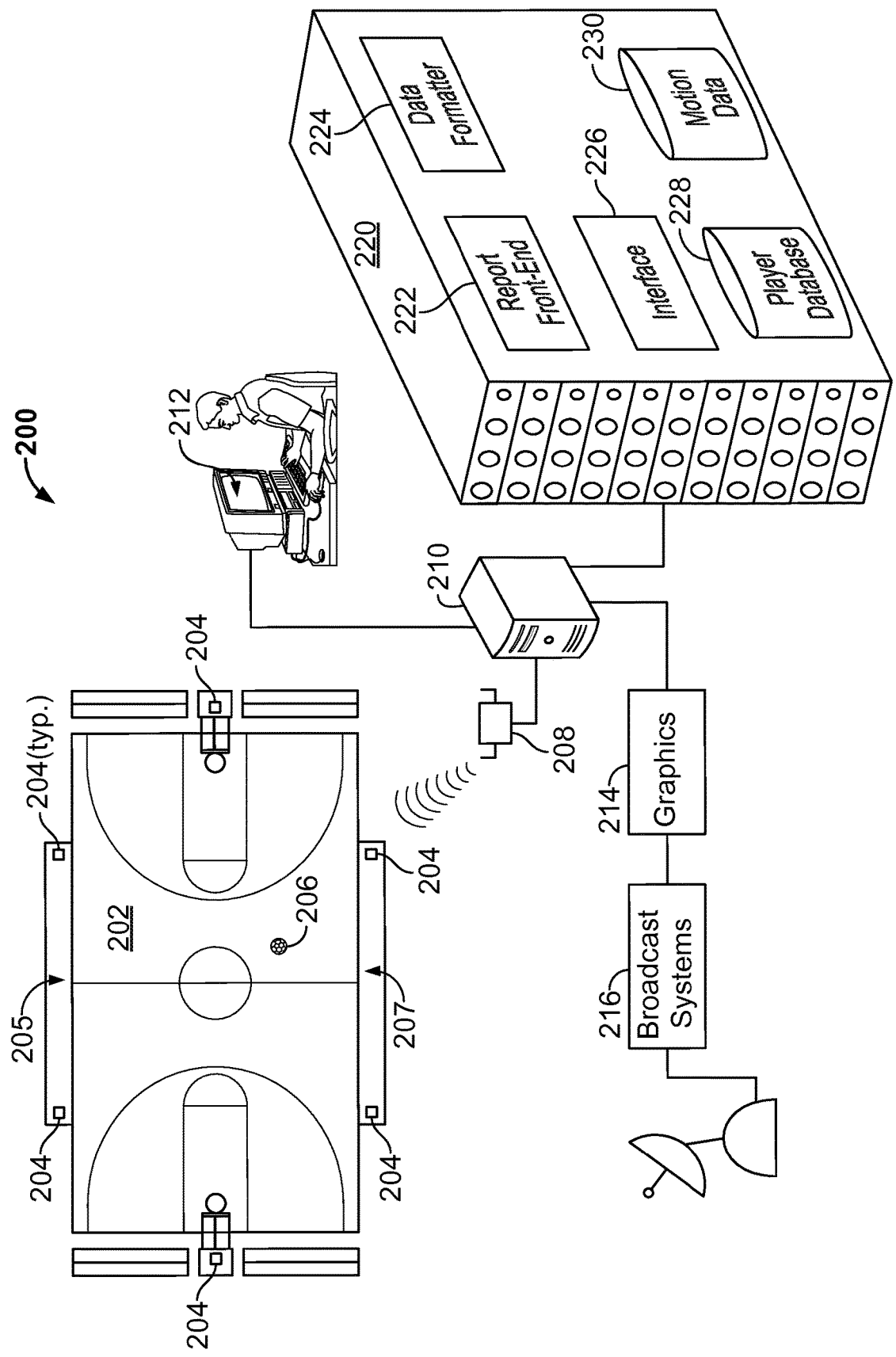
FIG. 2 is a block diagram of an illustrative system for collecting, presenting, and storing data from a sporting event.

FIG. 2 is a block diagram of an illustrative system 200 for collecting, presenting, and storing data from a sporting event. In general, the system includes a number of mechanisms for capturing game play data, including sensors in a basketball 206 and positioned around a court 202, and data entered by a human observer of a game. That data is telemetrically captured and stored in a database in a manner that they can be associated with other occurrences as part of the game, such as by linking all data to a timeline that is common with timing for video that displays the game play. The system 200 may represent a particular implementation of such a monitoring and analysis system as is shown with respect to FIG. 1 above and the other figures below.

In the system 200, the court 202 is shown with a ball 206 in play (though the players are not shown here, to make the image clearer). Sensors may be located in the ball 206, including accelerometer and gyro sensors. Also in the ball 206 is a wireless transmitter and associated electronics for telemetrically sending data in real-time from the ball 206 to transceivers 204 that are positioned around the court 202. Such communication may occur according to a typical wireless standard such as Bluetooth, WiFi, or the like. Separate sensors may be located in courtside advertising boards 207 on each side of the court 202 and may be used, e.g., to identify the location of the ball 206 and/or players on the court 202, such as by using known triangulation techniques or other position determination techniques. Also, a human observer at a terminal 212 may also enter data, such as brief textual descriptions, statistics, and score changes—similar to statistics like those traditionally shown with the ESPN GameCast system (e.g., made and missed shots, fouls, etc.).

The various sensors communicate wirelessly to a router 208 that is connected to a monitoring computer system 210, which may have one or more computers programmed to convert data generated by the various sensors into alternative forms. The computers may be located at a site of the sporting event, at a remote site, or at a combination of the two.

As one example, the various forms of data (e.g., from sensors in the ball 206 and from other sources) may be time-aligned with each other and with a game clock for the basketball game, so that subsequent querying for data may be used to obtain a portion of video or audio for the game, or to obtain corresponding statistics, such as to show the score of the game when a certain motion event took place, or the person who possessed the ball when the motion event took place. As one example, a user might query a database of data for a large number of games, looking for G force data above a certain level in the last 30 seconds of a game, and in time-wise alignment of the game score changing (increasing by 2 points), so as to automatically be provided with video of thunderous game-winning dunks. Such a user may be a technician at a company that provides data and video to a television network, or may also be a consumer who has downloaded an app to a smartphone or tablet computer.

The various gathered data may be provided to a graphics system 214, which may be used to query the data, either in system 210 or in database management system 220, and may provide graphics for superposition with a television video feed associated with the game that is provided by broadcast system 216, such as through a satellite uplink for further broadcast to a local area, nationally, or worldwide.

The database management system 220 may be a central system remote from the game that stores motion data from a large number of games, perhaps for an entire league and for multiple different sports, and may be a system operated by a service bureau that provides third party access to data, such as motion data of game balls, to subscribers that can include television networks. Local processing at the event may be used to generate graphic overlays for real-time or near real-time television broadcast, whereas processing remote from the event may occur for less time-sensitive and less specific uses, such as for access by members of the public, or for research by computer technicians looking for statistics to display with an analysis program on the network.

Certain components are shown as example structural components that the database management system 220 can use to provide such information. For example, a report front-end 222, which may be in the form of a web server or similar interface, can be used to receive query parameters from a user or an automated data extraction system and can provide a user interface for manual requests (e.g., in the form of JavaScript, HTML, or XML code that can be served to a large number of remote client computing devices). The font-end 222 may parse received requests and convert them to an appropriate query (e.g., SQL) to be applied to a motion data 230 database that contains different forms of motion data, including data gathered by in-ball sensors. The other data may be part of the same database system 220 or part of a separate system, including a separate organizational entity with which the operator of system 220 has a data sharing agreement, wherein the communication occurs according to previously agreed-upon application programming interfaces (APIs).

As one example, a player database 228 may store data about particular players, including traditional statistics (e.g., shots made and missed, points per game, minutes played, rebounds, etc.). Additionally, the player database 228 (either in a common database or in databases split across multiple systems) may store motion-related data about a player, either in raw form or in a derived form. The raw form may include particular accelerometer data and other motion data over time periods during which the player was handling a basketball. The derived data may include, for example, numbers that represent the maximum dribbling force at the beginning of each scoring drive by the player. The decision whether to employ raw data versus derived data may depend on the fact that the former is more detailed but is also more difficult and time-consuming to query or otherwise process—with the decision in each particular implementation depending on a particular balancing of factors.

A data formatter may interact with located search results from the databases and provided output for presentation via interface 226. For example, the data formatter 224 may generate a table or graph from information, and interface 226 may serve such a presentation, including by serving it in response to a technician at a statistical analysis company and/or an operator at a television broadcasting system. For example, a television technician may recognize that a color commenter at a basketball game has commented several times about a center's speed in picking up the dribble and shooting. The technician may then remotely query the system 220, identifying particular events associated with picking up a dribble and shooting, in order to obtain an average velocity profile for shots made when the center is under the basket (i.e., standing lay-ups or dunks), and can identify 5 other centers with whom the data is to be compared. The system 220 may obtain such data, the data formatter 224 may form graphs that show the paths (e.g., as viewed from the side) of each player raising the ball from a dribble to a shot, and may color each portion of each path in a color that indicates each player's relative speed at that point along the path. As a result, the commenter may immediately illustrate the point he has been making throughout the game, and his expertise as an analyst may be backed up with the real motion data. Of course, more complex and specific analyses and graphics may be prepared in advance of a game and can be shown at an appropriate time, including with updated information from the current ongoing game.

In this manner then, the system 200 may collect various forms of raw data—including from sensors in the ball or other playing item that is handled by players, from human observers of a game, and from sensors outside the ball or other handled item—and may store the data and make it available for various forms of subsequent analysis and display in a combined and correlated (e.g., time-aligned) manner. Such analysis may be predetermined, where the data is fed into predefined analysis mechanisms and automatically fed to a predefined on-screen display (e.g., to display the force of a dunk immediately as the dunk is made or immediately after, either fully automatically or in response to a broadcast technician making a simple selection on a control computer to have such information displayed).

Figure 3A:
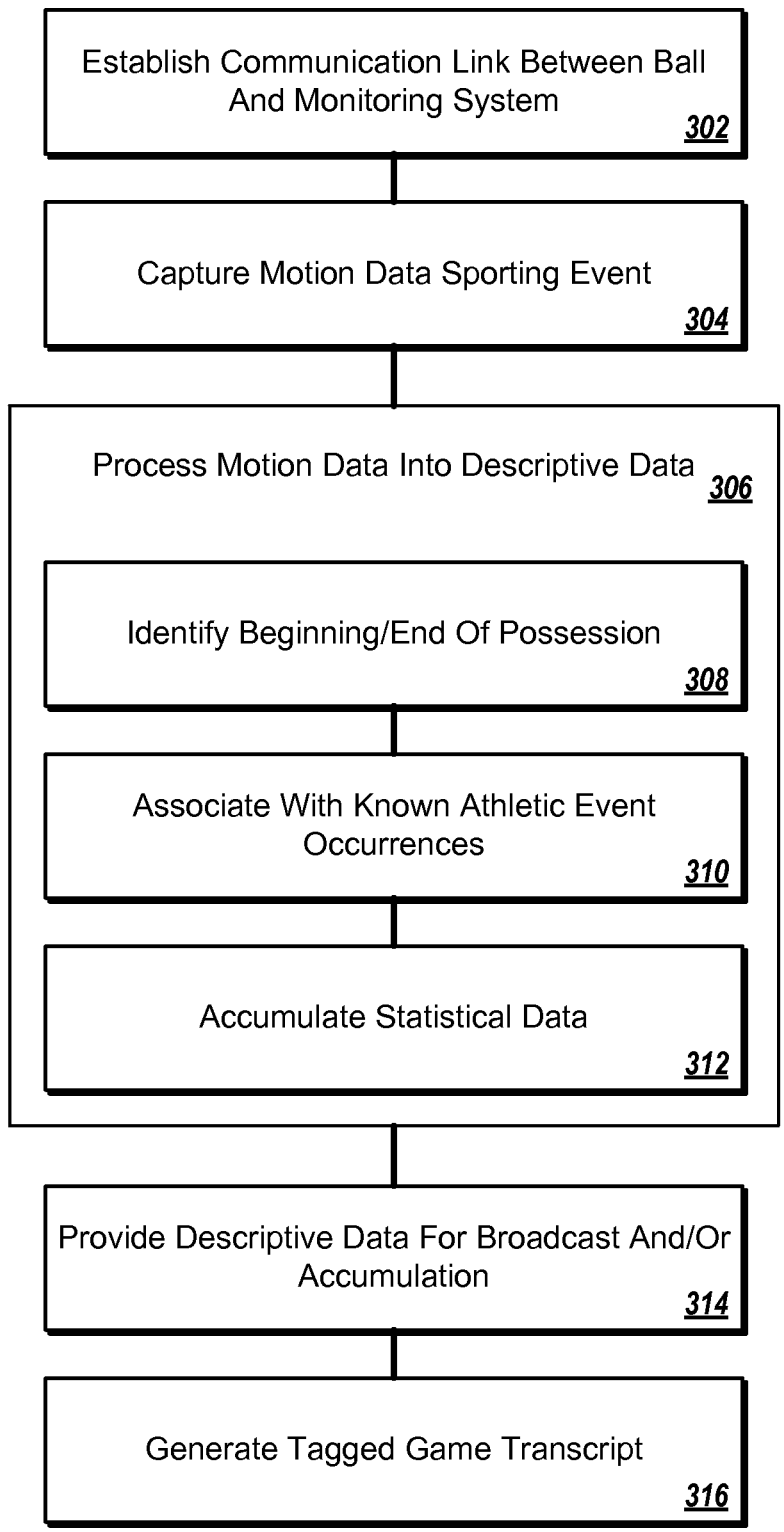
FIG. 3A is a flow chart of an example process for gathering and analyzing motion data and other types of data during a sporting event.

FIG. 3A is a flow chart of an example process for gathering and analyzing motion data and other types of data during a sporting event. In general, the process involves obtaining data wirelessly while a sporting event is being performed, from sensors in and/or around a game ball, using the data to generate a textual or graphical representation of the performance, and presenting the textual or graphical representation along with a video performance of the sporting event, including in an overlay on the video of the event occurring in real-time (e.g., in a graphics box near a periphery of the screen in a familiar manner).

The process begins at box 302, where a communication link is established between an electronics package in a ball and a communications system. The package may be activated in various manners, such as by a sensed motion of the ball (e.g., via a cantilevered switch that is biased away from contact but that achieves contact when the ball is bounced on the floor with sufficient force). The electronics, when activated, may then send a wireless signal (e.g., for Bluetooth or WiFi) that may be sensed by one or more wireless routers or other network interface devices in the vicinity of a playing area for a game. The ball may then start communicating with a computer that is on the same network. Similarly, communication may occur directly between a ball and a computer, such as a smartphone or a tablet computer.

The initial communication may establish a handshake and a protocol for receiving data from the ball by the computer. For example, the ball may send data packets in which a header identifies the purpose of the packet, and the body of the packet holds corresponding data. Some packets may be used to establish and update a communication session, while others may carry actual motion data from sensed handling of the ball by players in a game.

At box 304, the sensors begin capturing motion data and transmitting it to the computer. Again, as indicated above, the transmission may occur in real-time or near real-time while a game is proceeding. Alternatively, the device may be provided with sufficient memory to store data for an entire game or portion of a game (e.g., a quarter), and the data may be read off the ball during a break in the game (e.g., by placing the ball in a dock at a scorer's table for a minute during a time-out). The computer may organize such downloads so that the ball is instructed to erase its memory of data after the data has been copied off the ball.

With the motion data captured, the computer system may begin to process the motion data into descriptive data at box 306. In particular, the raw data that is received from the ball may not be conveniently manipulable, so the computer system can convert it into a form that is more useful. As one example, the data may simply be an undifferentiated stream of data from each of three accelerometers in a sensor pack on the ball, without correlation to what was occurring in the game when the motion occurred. The computer system may thus make such correlations.

Then, at box 308, the system identifies the beginning and end of possessions of the ball. For example, the system may perform analyses like those discussed in pending U.S. patent application Ser. No. 13/259,842, which is incorporated by reference in its entirety herein, in order to determine when a player released the ball, when another player received the ball, when a floor contact was made, and when a shot was released, among other things.

At box 310, the process associates those motion events or other events sensed by the ball (e.g., electric field sensors in the ball (e.g., magnetometers) may sense when the ball has passed through a metal ring in the form of a basketball or soccer goal) with real-world events in the game. For example, a timed stream of data from other sources, such as from a statistician at the game, can be compared to and aligned with the motion data (or vice-versa) so that, for example, when the statistician indicates a change in score, the time of the change in score is aligned with magnetic or motion data that corresponds to a ball passing through the hoop. Also, the statistician's indication of the person who scored the basket may also be correlated to the motion data that preceded the basket being made to assign that person as the handler for the prior motion data. That handler assignment may also be correlated with handler identification received from other sources, such as human or electronic spotters around the court or otherwise viewing the game. Together, such steps may create a form of "transcript" for the game in which relevant motion data is time aligned with discrete "events" such as possession changes between different players, scoring events, rebounding events, and the like.

At box 312 then, the process accumulates statistical data from the event. For example, once ball handlers are associated with various statistics, including motion data, statistical data that is not time-aligned can be accumulated for those players. As various examples, the following derivative statistics can be accumulated:

Accumulating total handling time for each player in a game and across a season.

Generating average handling time for each player based on each time the player handles the ball.

Generating average dribbling speed, force, or time between bounces.

Generating average "time in hand" for dribbling of a basketball.

Generating average force from scoring kicks in soccer.

Other similar statistics may be accumulated as a game is played or later, including using raw data to generate new statistics that may not have even existed when the data was captured.

At box 314, descriptive data is provided for the statistics so that it can be broadcast or otherwise accumulated. For example, a graphic can be generated from statistical data, or raw motion data may be converted into derivative data that is more readily manipulated and searched, such as a total number of revolutions on the basketball when a player takes a shot from a particular distance.

Finally, at box 316, a tagged game transcript is generated. For example, while a game is being played, certain data may be associated with the aligned transcript or timeline of the game that is discussed above. But after the game is complete, additional analysis and supplementation may be performed to provide for a richer data set. Such analysis and processing may occur, for example, under the direction of a technician who is trained for enriching the data set available for such information. In performing such actions, the technician may be shown a top-bottom split-screen with video of the game on the top, and data from the timeline moving along the bottom portion, with a number of different scrolling parallel lines—e.g., one line that shows aspects of the motion data, with "transitions" (e.g., scoring events or handler changes) shown by vertical lines through the graphs. The technician could thus re-watch the game to confirm that each relevant piece of data was captured and placed in the right location, before causing the data to be identified as complete and "archived" for a system—effectively performing post-production quality control. The technician could also add additional data and bookmarks of the transcript, such as where highlights occur in the game, so that such bookmarks can be readily found later by others. Also, the system may be used to make clips or subsets of the broadcast audio/video and the data in response to a selection by a technician, and such data can be exported to an application that permits review of highlights with motion-based data being presented.

Figure 3B:
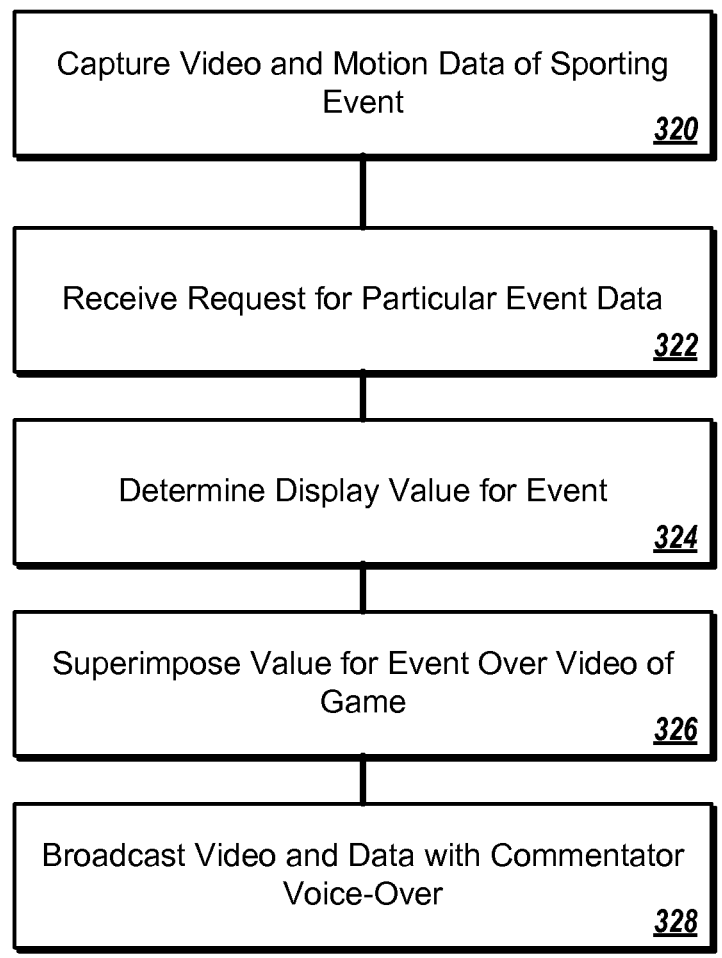
FIG. 3B is a flow chart of an example process for providing motion-based information with a television broadcast.

FIG. 3B is a flow chart of an example process for providing motion-based information with a television broadcast. In general, the process includes obtaining data from motion sensors in a game item that is handed by players, such as a game ball, and combining such data with other data to provide for a real-time or near real-time superimposed video image of a game as the game is in progress.

The process begins at box 320, where video and motion data of a sporting event are captured. For example, cameras may capture the video and associated audio in a traditional manner for live television broadcast, while commentators (e.g., a play-by-play and a color commentator). Simultaneously, motion sensors in a ball or other handled game item can collect motion data about the item and other data described above. Such motion and other data can be provided, in real-time or near real-time to a system that processes the data, such as by recognizing the occurrence of a predefined event—e.g., a ball undergoing more than n G's of acceleration. For example, in a soccer game, anytime a goal is scored and a video technician orders a replay, the system may be programmed to obtain data that shows the number of G's on the ball in the last kick, and presents such information for display as part of the instant replay.

Alternatively, a technician can define bounds of certain events with the ball, such as by selecting a portion of video (e.g., for an instant replay), and the system can performed predetermined analysis for the portion of video (e.g., where the technician can select from a list of available analysis and presentation packages, such as a dribble-and-drive package that shows the G forces of dribbles or the time between dribbles at the various parts of a drive in a basketball game.

At box 322, a request for display of such information is received. Such a request can occur when the data is not generated automatically as described above, or when the user wants information other than that generated automatically. For example, the technician described above may select a type of visual from a list of multiple available visuals, where the selection may indicate the sort of graphic and related data that the technician wants to have shown to viewers. The list of available visuals may be initially narrowed down upon the system identifying recent events in a game, e.g., so that scoring-related visuals can be identified for the technician if the in-ball sensors indicate that a goal was just scored, where as another sub-set of selections may be available if the sensors indicate that a steal just occurred.

At box 324, a display value for the event of interest is determined. For example, if a technician or other user selected "dunk G force" from the list of visuals, then a maximum G force may be computed for the seconds around the time that a transcript of the game indicates that a most-recent score was made. In other implementations, consumer users of an app may be watching a game, and may simply select a button to have a replay shown, and the system may identify, e.g., from heuristic rules, which type of data is to be displayed superimposed over a replay of a recent important play.

At box 326, the calculated value is superimposed over the event that occurred in the video, either in real-time or as part of a near real-time instant replay. Such superposition may include animations and other graphics in a familiar way, including by panning or scrolling an icon, with the value in the icon, from an edge of the television screen and then scrolling it back off, in coordination with a tone to alert a viewer that new information has been added to the screen, and so on.

At box 328, the video and data are broadcast in coordination with the commentator voice-over. For example, in a soccer game, a velocity of a shot may be displayed in real-time every time the ball moves higher than a predetermined speed. A broadcast team may then switch to an overhead instant replay that better shows the positions of players on the field, and may show G forces from a kick or rotations (e.g., RPM) of the ball, if the ball was measured to have a high rate of spin (and thus to have curved and to have fooled the goalie). Thus, with the replay, the commentator may talk about how amazing the curve on the shot was, and otherwise provide verbal annotations that are relevant to the motion-based data that is being displayed on the screen.

FIGS. 4A-4F show screen shots of sports broadcasts superimposed with motion-based data. In general, the screen shots show example video, either as live or instant replay video, that has been annotated with graphics using motion-based data of the type discussed above. The particular screen shots here are provided as particular examples of the form of data that can be shown to a viewing audience, and manners in which it can be displayed. Other types of data and manners of presentation may also be employed.

Figure 4A:
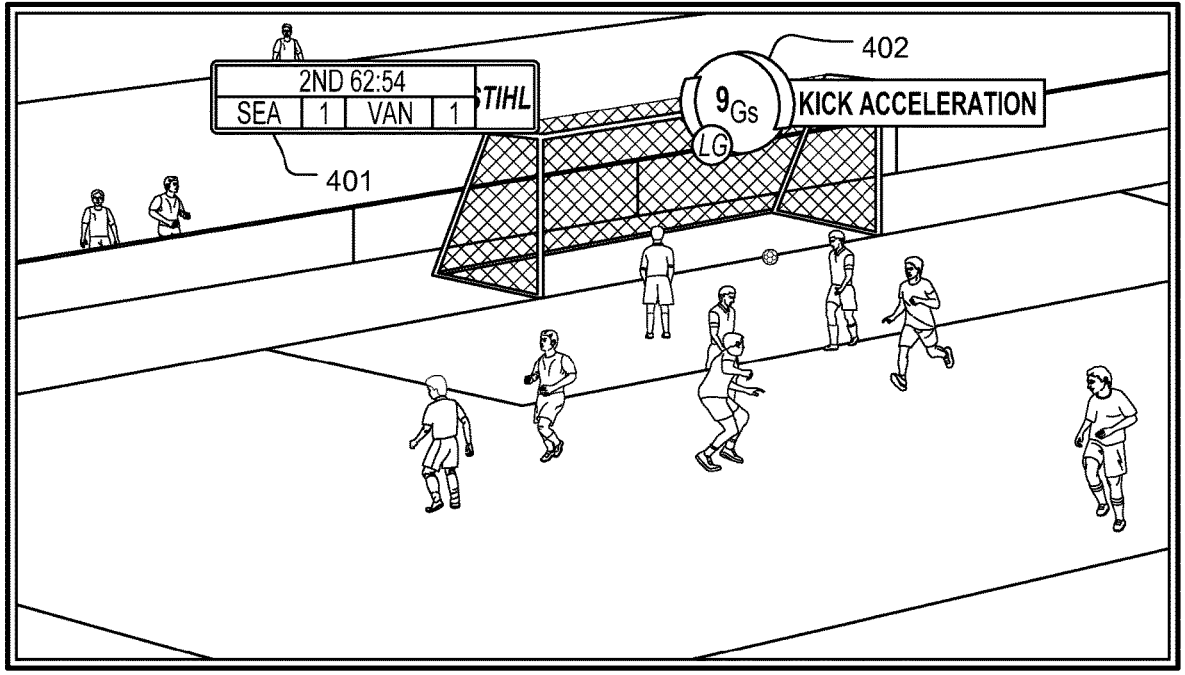
FIGS. 4A-4F show screen shots of sports broadcasts superimposed with motion-based data.

Referring now to FIG. 4A, there is shown a video of a soccer game in progress. In this example, a goal has been scored just a couple seconds prior, with the ball rolling back out of the goal and the goalie looking dejected. At the top of the screen is a traditional scoreboard 401 and an advertisement for Stihl chainsaws, panning into hiding behind the scoreboard 401. Another graphic 402 has been added to the screen since the goal scorer kicked the ball, and shows a unique logo with a label of "kick acceleration." The logo may be presented whenever motion-based data is displayed so as to create a mental connection between the logo and the presented data, so that a viewer will know that such data is special and different than traditional data that is displayed. Here, the viewer sees that the ball underwent 9 G's of acceleration when the player kicked it in for a goal. Although such a number may not mean much to the viewer at first, after seeing it multiple times, viewers will begin to form an appreciation of what is an impressive acceleration level and what is not. The system here may have been programmed to display such supplemental motion-based data only if the G force exceeds 7 G's, for example.

Figure 4B:
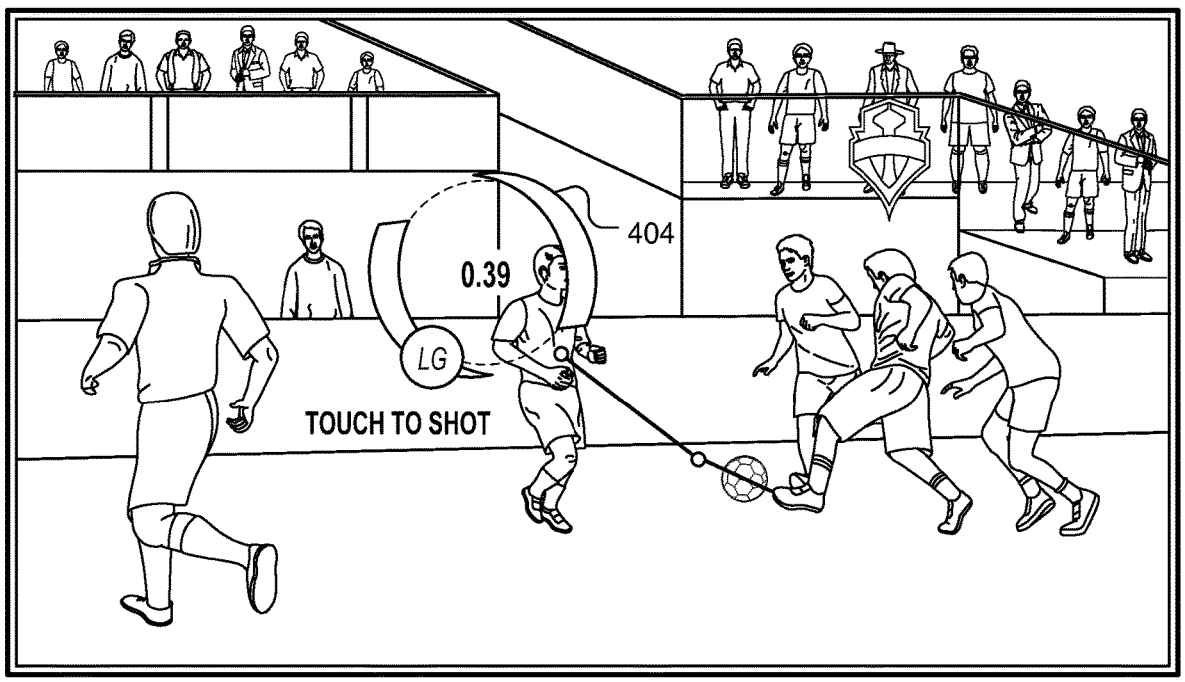

In FIG. 4B, a field-level stop motion instant replay is being displayed. Here, the parameter being shown in the graphic 404 is the time elapsed from when the player first touched the ball with his foot until he took the scoring shot. Similar times can be shown as the player dribbles from one foot to the other, to show how quickly he changes feet. And the motion can be stopped and an updated parameter value can be displayed at each such change in the relevant player action that is being displayed. As another example, in a basketball game, where players pass the ball quickly from one to another before hitting the open man, the replay may be stopped at each pass and the time between each such pass can be displayed similar to the time displayed here.

Figure 4C:
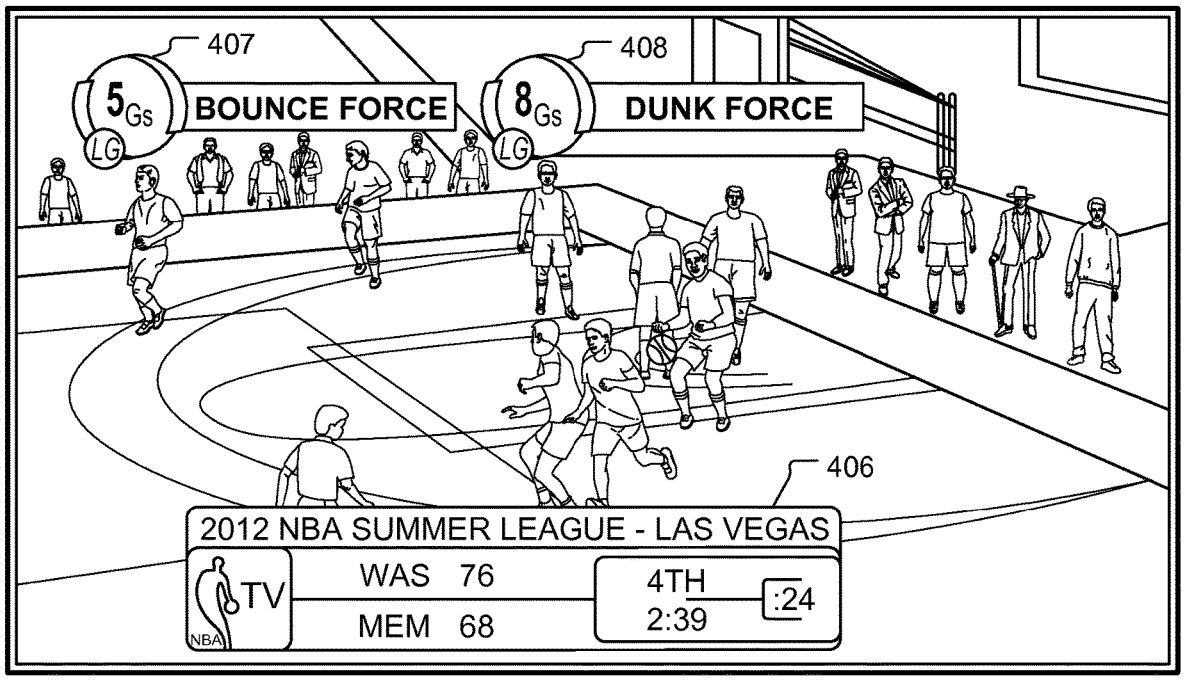

In FIG. 4C, there is shown a basketball game in the process of being played, and as in FIG. 4A, a goal has just been scored, this time in the form of a slam dunk. In this example, the scoreboard 406 is near the bottom of the screen in a typical position, and two motion-based data displays 407 and 408 are provided near the top of the screen. A first display 407 shows the force with which a dribble or a bounce pass that led up to the dunk hit the floor. Such a graphic may have been displayed as soon as the bounce occurred and before or at the same times as the dunk. The second display 408 is a graphic for an 8 G dunk. This may be displayed adjacent the bounce G force, as the system may have identified the presence of the first graphic 407 at the time the second graphic 408 was called for, so that the system shifted the display location of the second graphic 408 so that the two graphics 407 and 408 could be shown simultaneously with each other and adjacent to each other.

Figure 4D:
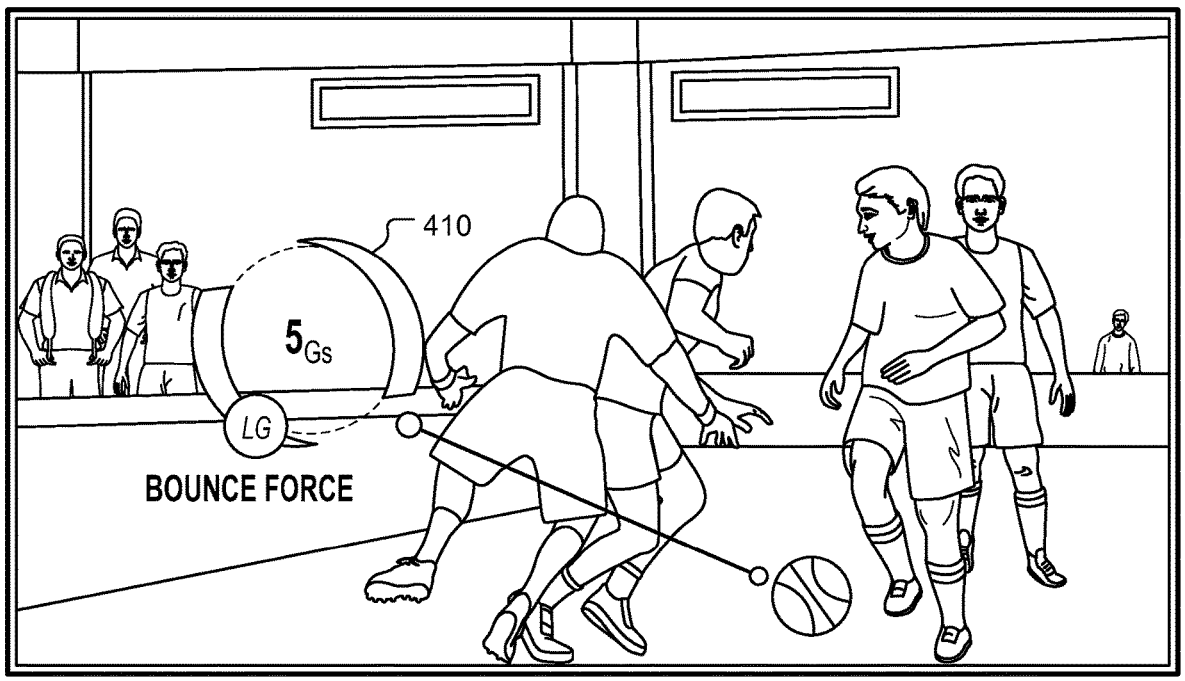

FIG. 4D shows a court level instant replay, which could be a replay of the play leading up to the dunk in FIG. 4C. In this case, the G force of the guard's dribbles is displayed in the graphic 410 as the guard cuts through traffic. Such information may indicate how hard the point guard forces the basketball to the ground when first beginning a drive, as opposed to when he is continuing a drive. The icon and parameter value may be removed, and the motion of the video may be restored until the next bounce, where the motion may again be paused, and an icon showing the G force of that next bounce may be displayed long enough for a viewer to see it, before the video is begun playing again.

Figure 4E:
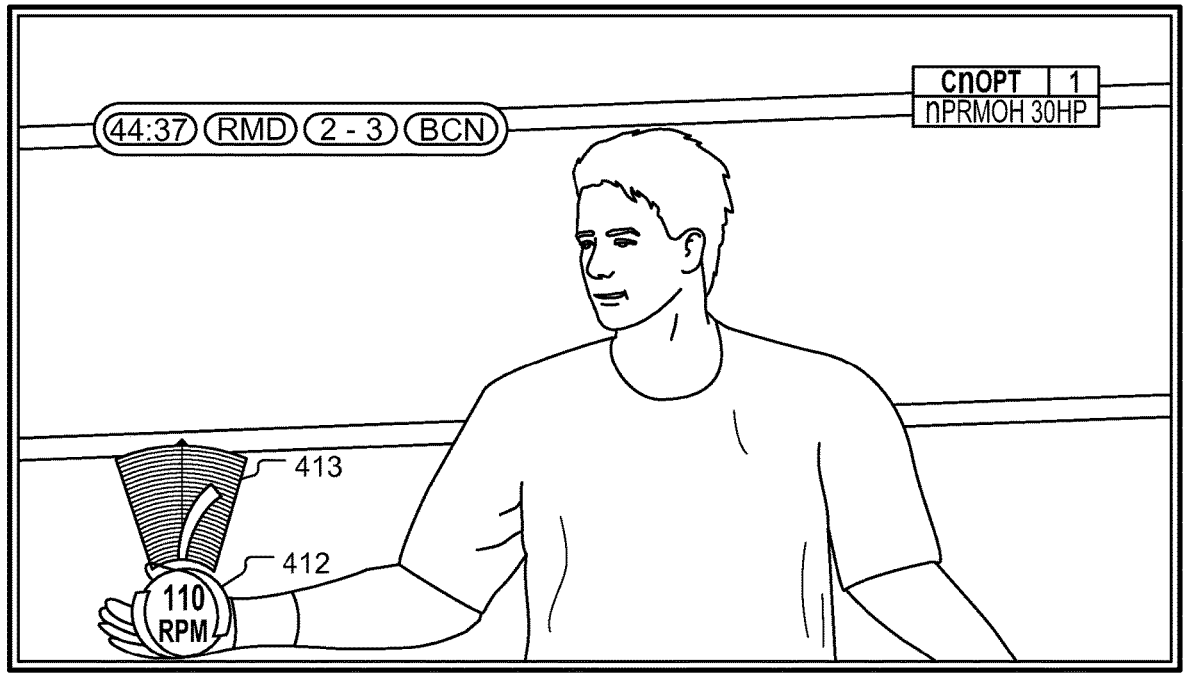

FIG. 4E returns us to soccer, where again, a goal has just been scored—this time on a penalty kick. The figure shows an incredulous goalie, along with a graphic 412 that uses a logo similar to the logos in the other screen shots, but this time appended with a different extension 413. The extension 413 here shows the path of the shot that got past the goalie, and as one can see, it hooked sharply to the right. The graphic 412 also shows that the ball was spinning at 110 RPM after it was kicked—thus explaining the large level of "English" applied to the ball. The graphic 412 may have been added to the screen a split second after the goal was made (e.g., in response to sensors sensing that a goal had been made or in response to a person pushing a button or otherwise indicating that the goal was made).

Figure 4F:
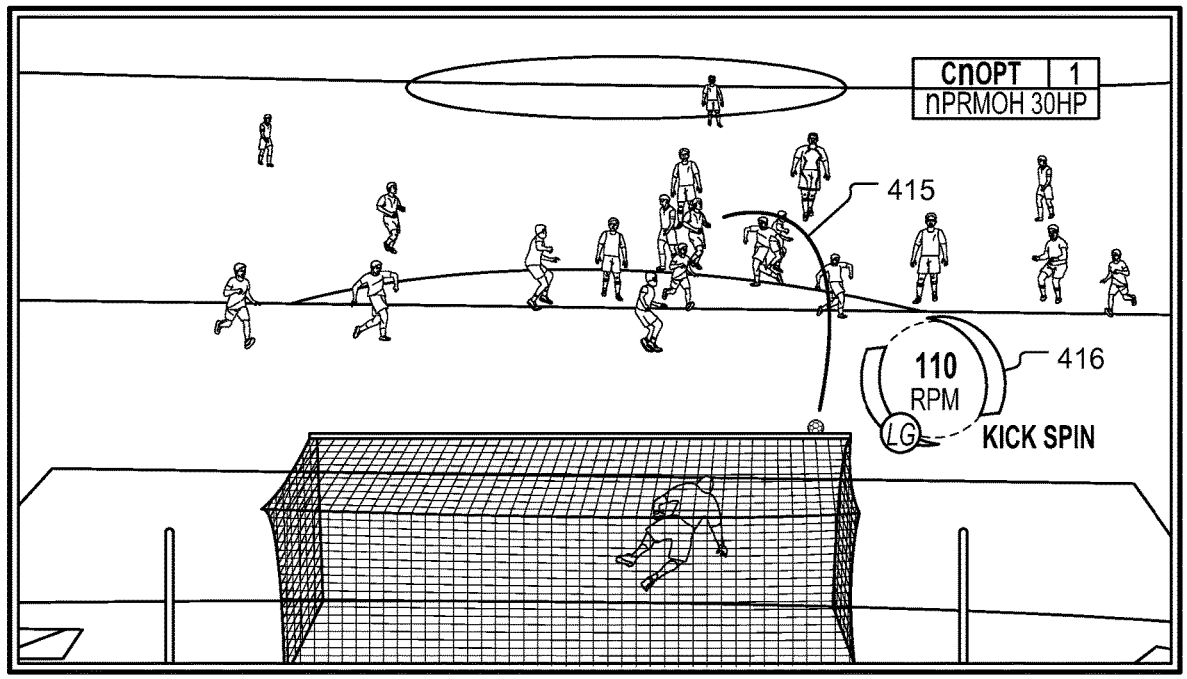

FIG. 4F shows the scoring kick in reverse angle. An arc 415 is shown to follow the ball on its rightward curving arc as it travels toward the goal, and a graphic 416 with the same logo and 110 RPM parameter value are shown, along with a "kick spin" label that makes even clearer to the viewer what is being shown by the graphic 416.

FIGS. 5A-5D show screen shots of a mobile app for incorporating motion-based data into sports information. These screenshots are examples of a tablet-based application, or app, that extends functionality now provided by services such as GameCast from ESPN.

Figure 5A:
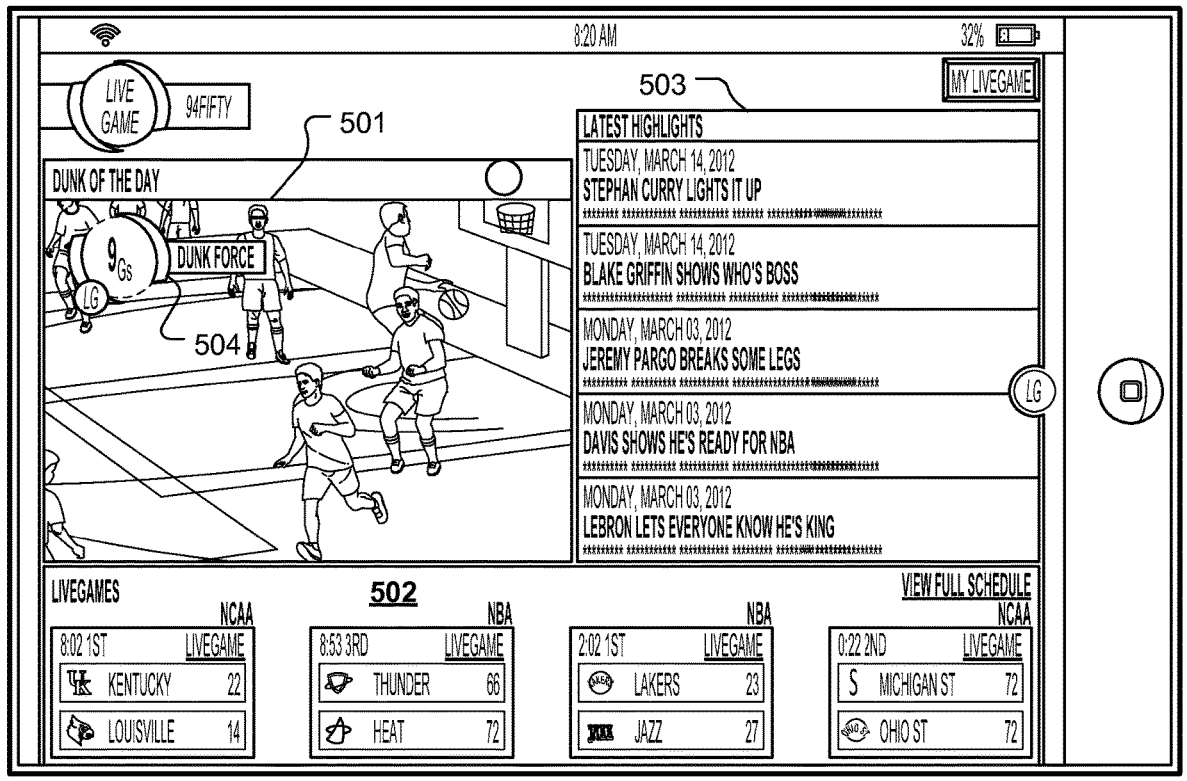
FIGS. 5A-5D show screen shots of a mobile app for incorporating motion-based data into sports information.

Referring now to FIG. 5A, a basketball overview screen of an app is displayed. That screen includes a video area 501 in the upper left, a scoreboard area 502 along the bottom, and a highlights area 503 in the upper right. The video area 501 is displaying a highlight of a dunk from a game earlier in the day, with a G-force indicator 504 for the dunk superimposed on the screen. Selections of items in the highlights area 503 will cause the selected highlight to be displayed in the video area, perhaps with superimposed motion-based data.

Figure 5B:
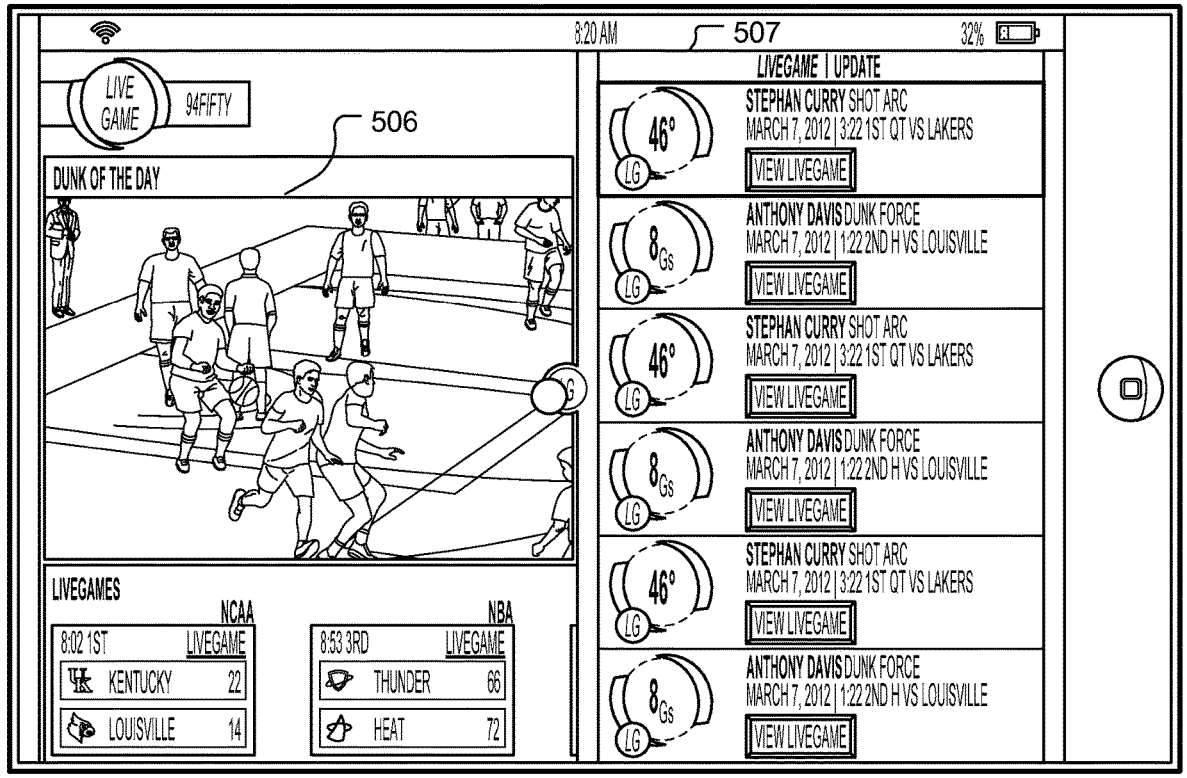

In FIG. 5B, the application shows what happens when a user chooses to pull out a panel 506 that shows top motion-based highlights of the day. These highlights are characterized by G-force of dunks and arc of long shots, though a variety of other parameters could also be used. Each entry in the list on the pull out panel 507 shows a player name who took the shot or made the dunk, along with a label that indicates the sort of event (shot arc or dunk force). In addition, the familiar logo appears next to each entry with a numerical indicator that shows the respective shot arcs and dunk forces. Selection by a user of one of the entries may cause the video highlight for the particular event to be shown, along with a superimposed graphic for the relevant motion-based data.

Figure 5C:
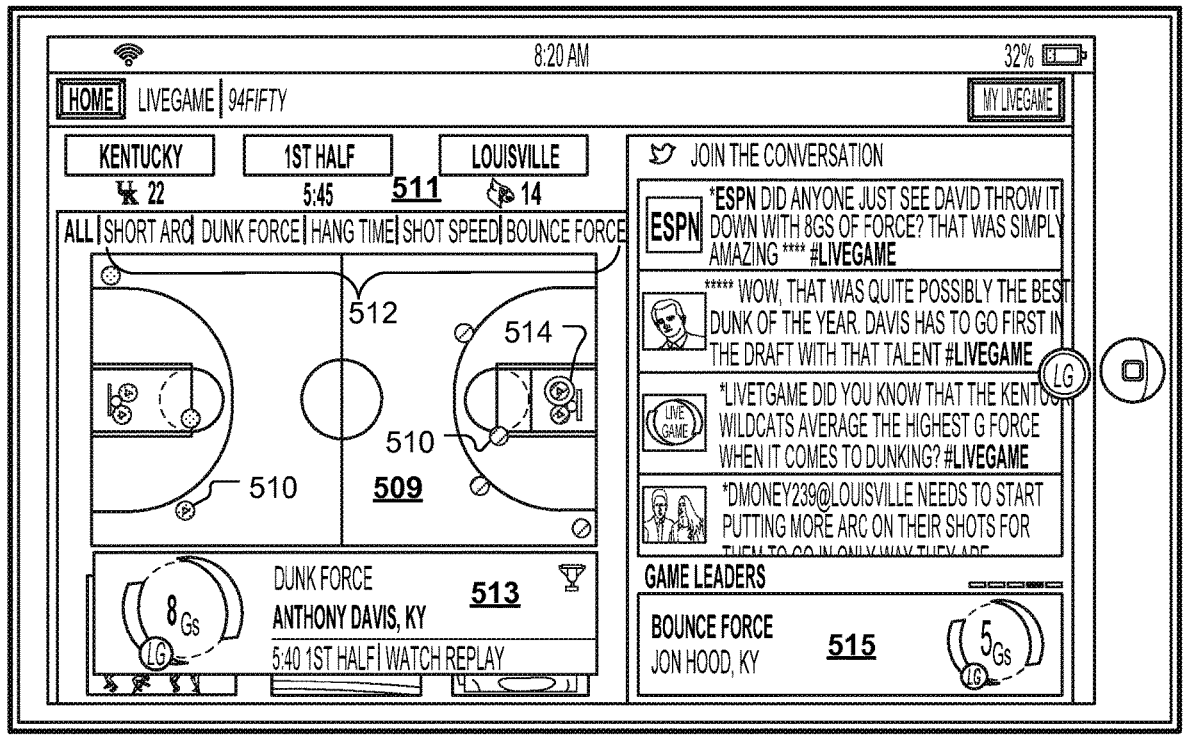

FIG. 5C shows another example by which a user can access motion-controlled data to find interesting basketball plays. Here, a user is looking at a particular game, and a graphic of a basketball court 509 shows dots 510 at locations from which shots were made and/or taken (x's can represent missed shots). A scoreboard 511 also shows the current score and time left, in a traditional manner. However, a number of motion-based filters 512 are available in this example, such as to display dots for dunks above a determined G-force level, shots with a hang timer greater than a particular value, and the like, as shown above the graphic of the court. Below the court graphic is shown detail 513 about a particular dunk for which the user selected a dot 514 on the court. And additional motion-based information 515 about the game is shown along the lower right, such as a screen for each of the greatest examples, in the game, of parameters tracked by the motion-based data system.

Figure 5D:
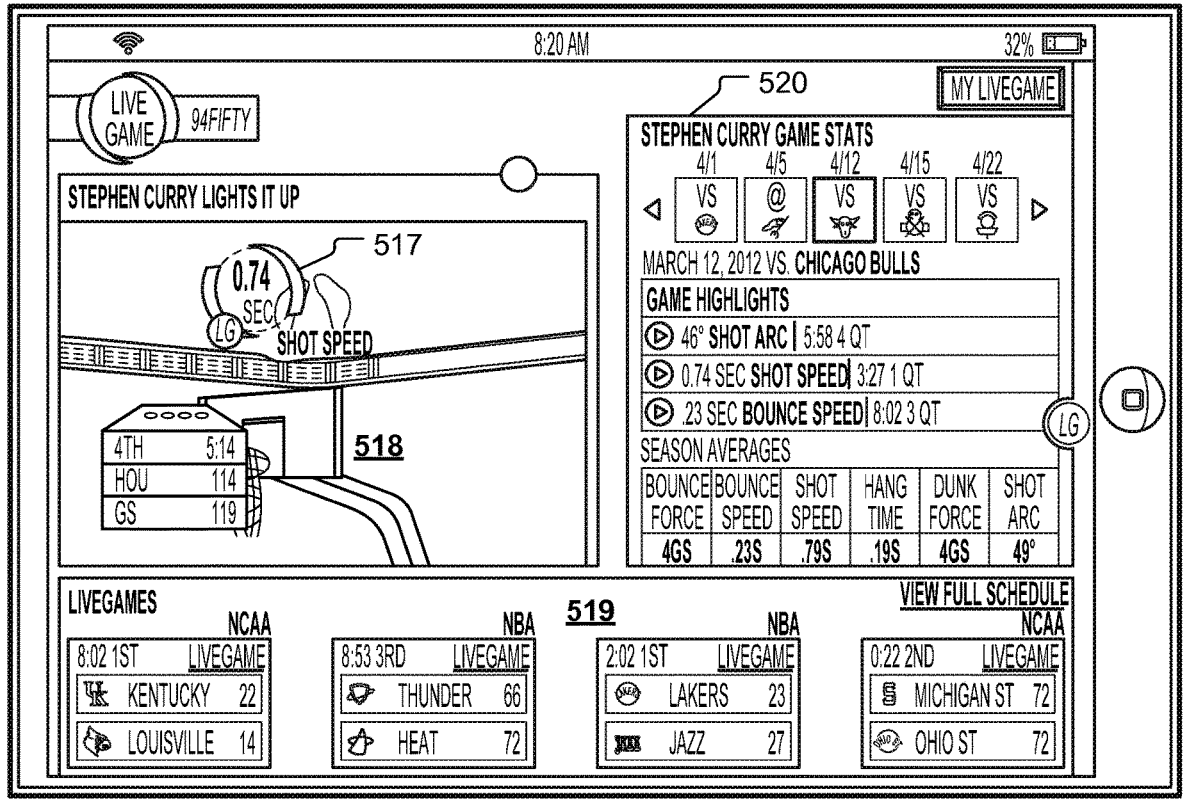

In FIG. 5D, the user has selected to see a particular Stephen Curry jump shot highlight, and it is playing along with the familiar annotated logo 517 superimposed over the video 518. In addition, the user can switch to see game statistics from other games by selecting a game along the bottom of the screen 519. Along the right edge 520, the user can see particular statistics about Stephen Curry, and may select certain hyperlinks to obtain additional detailed information about a particular selected parameter.

Figure 6:
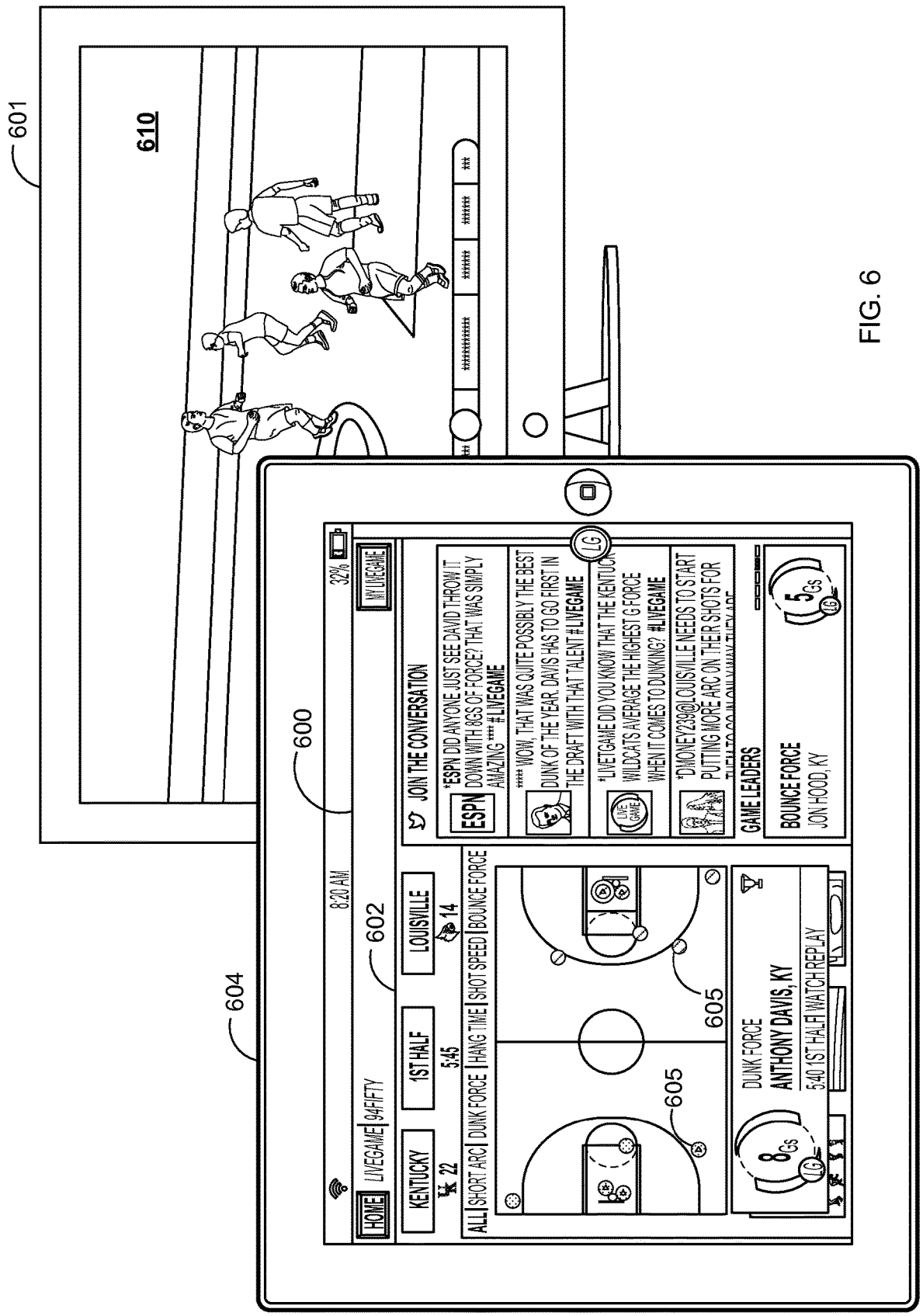
FIG. 6 shows an example of an application being used in combination with a television broadcast of a game.

FIG. 6 shows an example of an application 600 being used in combination with a television broadcast 610 of a game. In this example, the application 600 augments the display of a live game, where the user can obtain enhanced content, either separately though a connection between the application and a service, or jointly, by the application 600 obtaining data from the television or a set-top box, or the tablet 604 (or other computing device) and the television 601 both being logged into a common account with a cloud-based service, through which they coordinate their actions with each other. In one example, the additional data and functionality provided by the application 600 could be made available only if the television 601 or a personal video recorder attached to the television 601 indicates that the user has not skipped a prior set of commercials. Thus, such a coordinated system could encourage commercial viewing without compelling it.

In this example, the user is viewing on the tablet 604 a screen shot 602 that is similar to that in FIG. 5C, and watching a normal-looking broadcast 610 on the television 601. As the game is played, additional data may be added to the tablet 604, such as additional dots 605 that represent made or missed shots on the graphic of the court on the application. Also, motion-based data may be shown below the court as it occurs, and a list of memorable events (as indicated by their motion-based data) can be maintained, and a user's selection of one of the events may cause a highlight of the event to be played where the court is shown in the application 600—after which the display of the court may return.

Selections by the user on the tablet 604, and what is displayed on the tablet 604 and/or the television 601, may interact in various manners. For example, a user may be allowed to identify a "profile" that defines the sorts of notifications the user would like to see, either on the tablet 604, the television 601 or both. For example, the user may want to see only a full-screen basketball game, without any overlays (other than, perhaps, required promotional overlays from the broadcaster). The user may instead want to see a traditional format, which shows a scoreboard in one corner of the screen, and perhaps a ticker along an edge of the screen. Alternatively, the user may select to have motion-derived notifications shown on the television display 610 (or not shown), and such a selection may be reflected as the game is broadcast. Thus, various different presentations of supplemental data for a sporting event, such as scores and closely related information (e.g., time outs remaining, whether a flag has been thrown, how many outs there are and how many people are on base, and down and how many yards until a first down), motion-derived data (e.g., G forces on a ball, timing of forces on a ball, etc.) may be displayed according to the user's selection on the television 601, the tablet computer 604 or other such portable electronic device (e.g., a smartphone), or on both 601 and 604.

Figure 7:
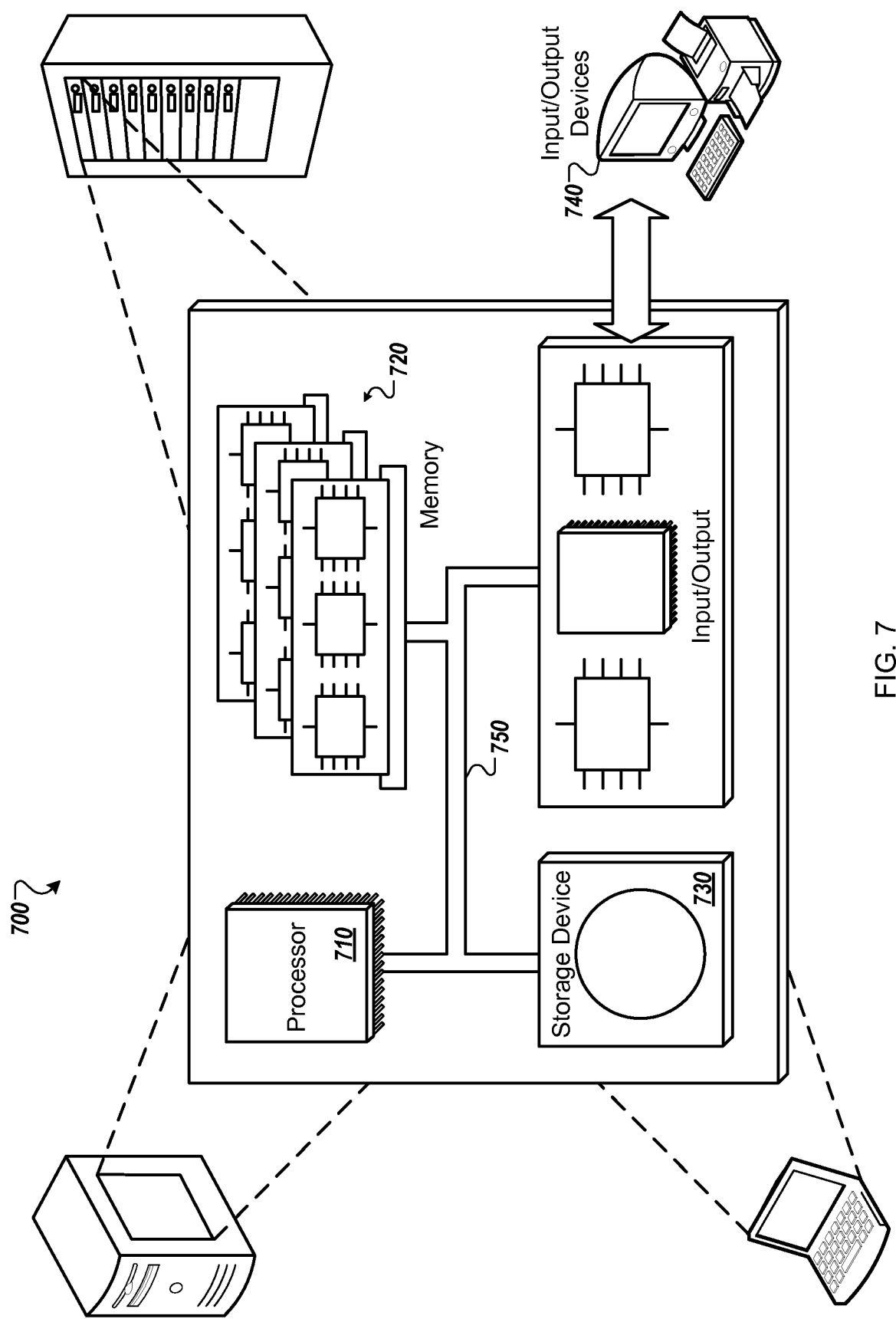
FIG. 7 shows an example of a computer device and a mobile computer device that can be used to implement the techniques described here.

FIG. 7 is a schematic diagram of a computer system 700. The system 700 can be used for the operations described in association with any of the computer-implement methods described previously, according to one implementation. The system 700 is intended to include various forms of digital computers, such as laptops, desktops, workstations, personal digital assistants, servers, blade servers, mainframes, and other appropriate computers. The system 700 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 700 includes a processor 710, a memory 720, a storage device 730, and an input/output device 740. Each of the components 710, 720, 730, and 740 are interconnected using a system bus 750. The processor 710 is capable of processing instructions for execution within the system 700. The processor may be designed using any of a number of architectures. For example, the processor 710 may be a CISC (Complex Instruction Set Computers) processor, a RISC (Reduced Instruction Set Computer) processor, or a MISC (Minimal Instruction Set Computer) processor.

In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the system 700. In one implementation, the storage device 730 is a computer-readable medium. In various different implementations, the storage device 730 may be a floppy disk device, a hard disk device, an optical disk device, or a tape device.

The input/output device 740 provides input/output operations for the system 700. In one implementation, the input/output device 740 includes a keyboard and/or pointing device. In another implementation, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described herein as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described herein should not be understood as requiring such separation in all embodiments, and it should be understood that the described program components and systems can generally be integrated together in a single product or packaged into multiple products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method for displaying information on a video feed of a basketball game comprising:
   receiving at a processor a stream of motion data originating from a sensor on a basketball reflecting motion of the basketball;
   identifying, using the processor, within the stream of motion data a data subset reflecting a beginning location and an end location of a predetermined event within the stream of motion data, wherein the processor identifies the beginning location of the predetermined event by comparing the stream of motion data to a data signature associated with the predetermined event and selecting as the beginning location a data location corresponding to the data signature;
   receiving at the processor a request to display descriptive data relating to the predetermined event;
   analyzing, at the processor, the data subset to identify the requested descriptive data;

annotating a live broadcast signal for a video feed of the basketball game with a data signal that, when transformed into an image, superimposes onto the image a display reflecting the descriptive data; and transmitting the live broadcast signal.

2. The method of claim 1, wherein the requested descriptive data is selected from a list of potential displays of descriptive data.

3. The method of claim 1, wherein the predetermined events are selected from the group consisting of a shot, a pass, and a dribble.

* * * * *